United States Patent
Modi et al.

(10) Patent No.: US 11,470,085 B2
(45) Date of Patent: Oct. 11, 2022

(54) SERVICE AND SECURITY ENHANCEMENT OF COMMUNICATION SERVICES

(71) Applicant: AT&T Intellectual Property I, L.P., Atlanta, GA (US)

(72) Inventors: Bhuvan C. Modi, Sammamish, WA (US); Mohammad Khalid Hafeez, Redmond, WA (US); Robert B. Zegheru, Redmond, WA (US); Jerry Shih, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 112 days.

(21) Appl. No.: 16/903,042

(22) Filed: Jun. 16, 2020

(65) Prior Publication Data

US 2021/0392136 A1  Dec. 16, 2021

(51) Int. Cl.
*H04L 29/06* (2006.01)
*H04L 9/40* (2022.01)
(Continued)

(52) U.S. Cl.
CPC ........ *H04L 63/0884* (2013.01); *H04L 9/3234* (2013.01); *H04L 63/0428* (2013.01);
(Continued)

(58) Field of Classification Search
CPC . H04L 63/0884; H04L 9/3234; H04L 63/102; H04L 63/0861; H04L 63/0428; H04W 12/06; H04W 12/08
See application file for complete search history.

(56) References Cited

U.S. PATENT DOCUMENTS 9,641,521 B2 * 5/2017 Egan .................... H04L 63/0853
10,097,666 B2 * 10/2018 Kaneko .................. H04L 67/32
(Continued)

OTHER PUBLICATIONS

GSM Association, Official Document RCC.14, Service Provider Device Configuration Version 7.0, Oct. 16, 2019, 85 pages.

*Primary Examiner* — Tongoc Tran
(74) *Attorney, Agent, or Firm* — Amin, Turocy & Watson, LLP

(57) ABSTRACT

Authorization for access to an application server and associated communication service can be desirably managed. When a device attempts to access an application server and service, an authorization server generates an encrypted token, comprising device identifier information, and communicates the token to the device. The device communicates the token to the application server. The application server communicates the token to the authorization server. The authorization server determines whether the device is validated to access the application server and service based on the encrypted token, private decryption key, and initialization vector, and based on subscriber-related information. The authorization server does not share the private decryption key or initialization vector with the application server. If validated, the authorization server communicates validation-related information, including a permitted portion of subscriber-related information, to the application server. If not validated, the authorization server communicates not-validated information to the application server.

20 Claims, 10 Drawing Sheets

(51) Int. Cl.
*H04L 9/32* (2006.01)
*H04W 12/06* (2021.01)
*H04W 12/08* (2021.01)
*H04W 12/40* (2021.01)

(52) U.S. Cl.
CPC ........... *H04L 63/102* (2013.01); *H04W 12/06* (2013.01); *H04W 12/08* (2013.01); *H04W 12/40* (2021.01)

(56) References Cited

U.S. PATENT DOCUMENTS

| | | | |
|---|---|---|---|
| 2011/0283111 A1* | 11/2011 | Bister | H04L 63/0807 713/185 |
| 2012/0317261 A1* | 12/2012 | Ahmavaara | H04W 4/50 709/223 |
| 2013/0332730 A1* | 12/2013 | Cosentino | G06F 21/6245 713/168 |
| 2017/0048240 A1* | 2/2017 | Chang | G06F 21/32 |
| 2017/0244676 A1* | 8/2017 | Edwards | H04L 67/141 |
| 2019/0180275 A1* | 6/2019 | Safak | G06Q 20/3827 |
| 2019/0333055 A1* | 10/2019 | Mohammed | G06Q 20/4014 |

\* cited by examiner

SERVICE AND SECURITY ENHANCEMENT OF COMMUNICATION SERVICES

TECHNICAL FIELD

This disclosure relates generally to electronic communications, e.g., to service and security enhancement of communication services.

BACKGROUND

Communication devices, such as wireless or mobile communication devices, can utilize various communication services (e.g., voice, data, or messaging services and applications) to facilitate communication of information between communication devices or performing other desired functions. For example, communication devices can utilize rich communication services to communicate enhanced messages (e.g., voice, text, or multimedia messages; or chat messaging or group chat messaging), perform Internet protocol (IP) voice calling, perform IP video calling, or communicate content, files, or other information (e.g., communicate content or files through content sharing or file sharing; or communicate location information via location services).

The above-described description is merely intended to provide a contextual overview regarding electronic communications, and is not intended to be exhaustive.

DETAILED DESCRIPTION

Figure 1:
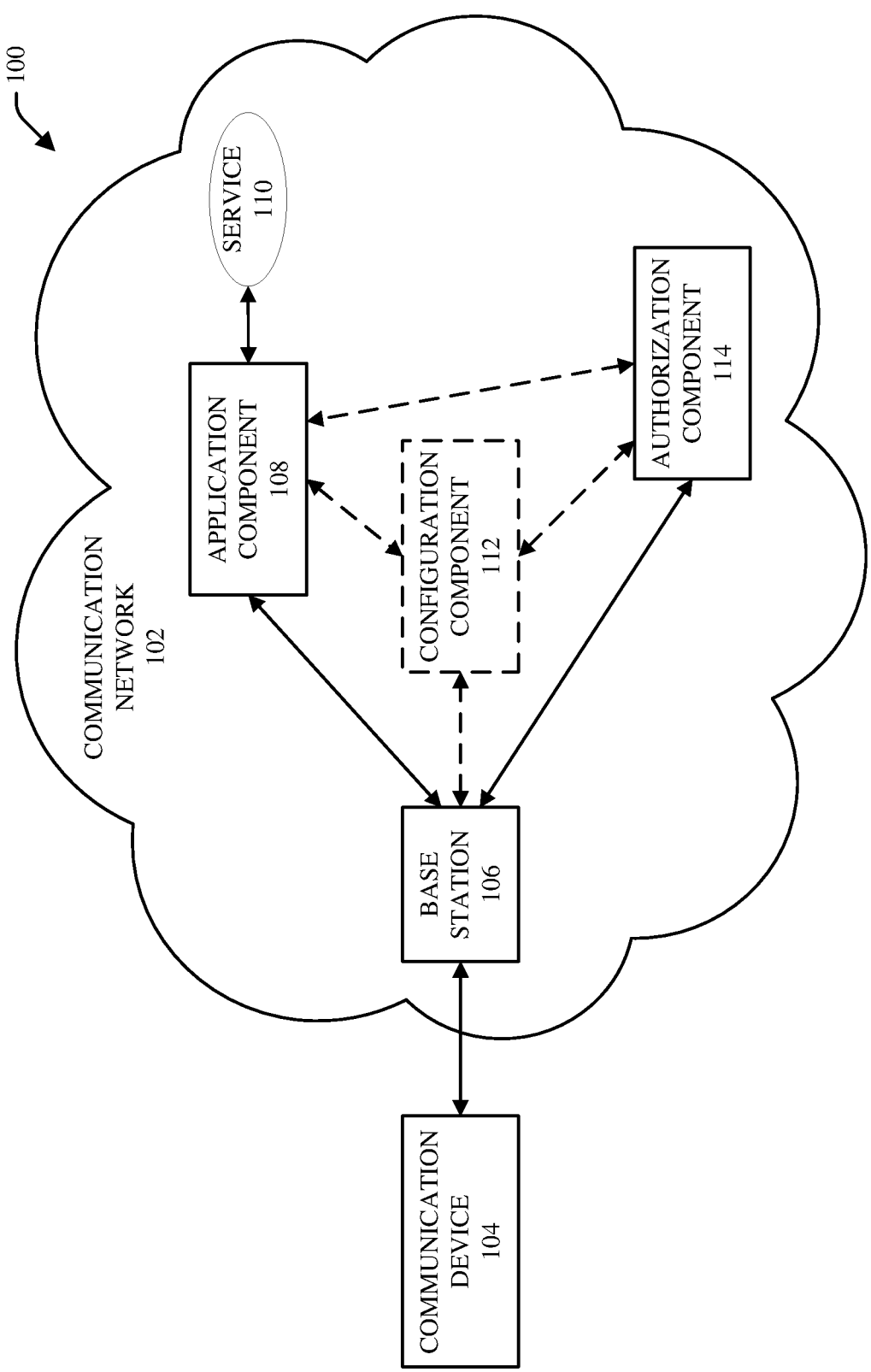
FIG. 1 illustrates a block diagram of an example system that can desirably control authorization and authentication for access to an application component and associated service by a communication device and/or an associated user, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to desirably managing (e.g., controlling) authorization and authentication with regard to accessing of a service and associated application component (e.g., an application or configuration server) by a communication device and/or an associated user. The disclosed subject matter can enhance (e.g., improve or optimize) security with regard to access to services to ensure that only communication devices and/or associated users that are currently authorized to access a service are able to access the service, enhance security of cryptographic information to ensure that private decryption keys, initialization vectors, and cryptographic algorithms are not shared with outside entities (e.g., application or configuration servers, or other unauthorized entities), enhance security of subscriber-related information (e.g., communication device and/or user-related information) to ensure that entities (e.g., application or configuration servers) are only able to access and receive certain subscriber-related information that such entities are permitted to access, while not being able to access or receive other subscriber-related information that such entities are not permitted to access, and enhance securing access to services and information (e.g., subscriber-related information) at a granular level to enable desirable implementation with internal carrier entities and external third-party entities, among other enhancements, such as described herein.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiply with a factor of $N_t$ over single antenna systems in a rich scattering environment.

Communication devices, including wireless or mobile communication devices, can utilize various communication services (e.g., voice, data, or messaging services and applications) to facilitate communication of information between communication devices or performing other desired functions. For example, communication devices can utilize rich communication services to communicate enhanced (e.g., richer or advanced) messages (e.g., voice, text, or multimedia messages; or chat messaging or group chat messaging), perform Internet protocol (IP) voice calling, perform IP video calling, or communicate content, files, or other information (e.g., communicate content or files through content sharing or file sharing; or communicate location information via location services).

When a communication device desires to utilize a communication service, the communication device can attempt to connect to an application server (e.g., application or configuration server) that can provide or facilitate providing the communication service. It can be desirable to secure the communication service and application server to prevent undesired (e.g., unauthorized or malicious) access to the communication service and application server. It can be desirable for the application server to know (e.g., know in real time) a subscription or account status of a particular communication device and associated user (e.g., subscriber) with regard to the communication service to facilitate knowing whether the particular communication device and user are authorized to access the application server and utilize the communication service. It also can be desirable to secure subscriber-related information (e.g., subscriber identification information, subscription or account status information, or service plan information, . . . ) and security-related information (e.g., private cryptographic key, cryptographic algorithm, token-related information, or initialization vector, . . . ) from access by application servers (e.g., third-party application servers), except when access to certain subscriber-related information or security-related information is permitted. It further can be desirable to not have to create and/or manage respective (e.g., different) decryption keys, initialization vectors, and/or cryptographic algorithms specific to respective application servers or content providers (e.g., third-party application servers or content providers).

Traditionally, when a communication device desires to access a service via an application server, the communication device can receive an encrypted token from an authorization server. The communication device can provide the encrypted token to the application server to attempt to gain access to the desired service. Traditionally, the encrypted token often can include a significant amount of information, including various items of subscriber-related information (e.g., device identifier, subscriber billing address or account, service plan information, and/or other subscriber-related information), associated with the communication device and/or associated user (e.g., subscriber) to enable the application server to know whether the communication device and/or associated user are authorized to use the service, what type of services the communication device is authorized to use, where and how to bill the subscriber (e.g., user) for using such services, etc.

The application server (e.g., application or configuration server) can decrypt the encrypted token using the private decryption key, initialization vector, and decryption algorithm, and can validate, or attempt to validate, the token. The application server can use the decrypted information to determine whether the communication device and/or associated user are authorized to use the service, what type of services the communication device is authorized to use, where and how to bill the subscriber (e.g., user) for using such services, etc. However, there can be a number of the issues and drawbacks associated with including a significant amount of information, particularly subscriber-related information, in the encrypted token. One issue can be that the more information that is encrypted in the encrypted token, the more difficult in can be for an application server to suitably handle, decrypt, and/or otherwise process the encrypted token and the encrypted information therein. This can result in problems in determining whether the communication device is authorized to use the service and/or problems or delays in providing the service to the communication device, and/or can result in the application server not being able to process or suitably process the encrypted token and the communication device being denied access to the service. Certain application servers traditionally have had difficulties processing encrypted tokens (e.g., encrypted tokens that include a significant amount of information) and provisioning services to communication devices.

Another issue can be that, if the application server is not utilized to decrypt the encrypted token, or if less information (e.g., less subscriber-related information) is included in the encrypted token (e.g., to enable the application server to more easily decrypt and process the encrypted token and the included encrypted information), the application server will not have or may not have sufficient subscriber-related information to enable it to determine whether the communication device and/or associated user are authorized to use the service, what type of services the communication device is authorized to use, and/or where and how to bill the subscriber for using such services, etc. Thus, there can be undesirable issues with the traditional techniques relating to authorizing and provisioning services for communication devices and undesirable issues with not having the application server decrypt the encrypted token, including the encrypted information (e.g., subscriber-related information), and/or with the application server not having sufficient information to desirably (e.g., suitably) perform operations relating to authorizing and provisioning services for communication devices.

Still another issue can be that certain application servers (e.g., certain third-party application or configuration servers) can be less trusted or untrusted by the carrier entity that owns, manages, and/or operates the network(s) (e.g., mobility core network and/or service provider (SP) network)). Traditional techniques can enable even less trusted or untrusted application servers to have access to certain subscriber-related information of subscribers where it can be desired that such application servers not have access to that certain subscriber-related information (e.g., because such application server is not permitted to have access to such subscriber-related information and/or because such information is sensitive or confidential subscriber-related information), and/or can enable such application servers to undesirably have access to private decryption keys, initialization vectors, and/or cryptographic algorithms associated with token encryption and decryption.

Thus, traditional techniques for handling access to communication services and/or associated application servers can be undesirably inefficient, inaccurate or insufficiently accurate, or otherwise undesirable or unsuitable. Traditional techniques may allow unauthorized access to a communication service or associated application server. Also, traditional techniques for handling access to communication services can allow application servers to undesirably have access to private decryption keys and/or initialization vectors utilized during token encryption, and/or undesirably have access to subscriber-related information that an application server (e.g., a third-party application server) is not authorized to access or for which it can otherwise be undesirable to allow the application server to access. Traditional techniques also can result in problems that can cause an application server to not be able to suitably process an encrypted token (e.g., an encrypted token comprising a significant amount of subscriber-related information) or to not have sufficient subscriber-related information, and thereby not be able to desirably (e.g., suitably or acceptably) perform operations relating to authorizing or provisioning a service for a communication device. Further, traditional techniques for handling access to communication services can involve creating and/or managing different decryption keys, initialization vectors, and/or cryptographic algorithms for different application servers or content providers.

To that end, techniques for desirably controlling authorization and authentication for access to a service (e.g., communication service) and an associated application component (e.g., an application service or configuration server) by a communication device and/or an associated user are presented. An application component can be associated with one or more services, such as, for example, rich communication services. The application component can be associated with (e.g., communicatively connected to) an authorization component (e.g., authorization server) that can desirably (e.g., efficiently, securely, and optimally) control authorization and authentication for access to the application component and associated service(s) by a communication device and/or an associated user attempting to access the application component and associated service(s). In some embodiments, the authorization component 112 can be or can comprise an open identification connect (OIDC) server.

The communication device can communicate a service request to the application component to attempt to access the application component and associated service (e.g., rich communication services). In response to the service request, the communication device can be redirected to the authorization component. The authorization component can generate an encrypted token (e.g., encrypted authentication token), which can comprise device identifier information associated with (e.g., identifying) the communication device and/or associated user, and can communicate the encrypted token, comprising encrypted device identifier information, to the communication device. The communication device can communicate the encrypted token to the application component. The application component can forward (e.g., communicate) the encrypted token to the authorization component for validation (e.g., verification) by the authorization component. The authorization component can determine whether the encrypted token is validated, and whether communication device and associated user are validated to access the application component and associated service, based at least in part on the encrypted token, a private decryption key, a cryptographic (e.g., decryption) algorithm, and an initialization vector, and based at least in part on subscriber-related information associated with the communication device and/or associated user (e.g., subscriber).

For instance, the authorization component can analyze and decrypt the encrypted token, including the encrypted device identifier information, based at least in part on the encrypted token, private decryption key, cryptographic algorithm, and initialization vector (e.g., using the private decryption key, cryptographic algorithm, and initialization vector to decrypt the encrypted token). The authorization component can determine whether the token is authenticated, and accordingly whether the communication device and/or associated user are authenticated, based at least in part on the decrypted information, including the decrypted device identifier information, obtained from decrypting the encrypted token. In some embodiments, the authorization component does not share the private (e.g., secret) decryption key, cryptographic algorithm, or initialization vector with the application component.

If the authorization component determines that encrypted token is not authenticated (and accordingly, the communication device and/or associated user are not authenticated), the authorization component can communicate not-validated information to the application component to notify the application component that the communication device and/or associated user are not validated. In response to receiving the not-validated information, the application component can deny the communication device and/or associated user access to the service as well as access to the application component.

If, instead, the authorization component determines that encrypted token is authenticated (and accordingly, the communication device and/or associated user are authenticated), the authorization component can access subscriber-related information (e.g., subscriber identification information, subscription or account status information, or service plan information, . . . ) in a data store (e.g., subscriber database in the data store), and can analyze the subscriber-related information to determine a subscriber or account status (e.g., active status, suspended status, terminated status, non-existent status), service(s) to which the user and/or communication device (e.g., subscriber) is subscribed and/or has an account, and/or type of service plan associated with the service, etc. For instance, the authorization component can determine the real-time subscriber or account status of the communication device and/or user so that it can be known in real time whether the communication device and/or user are authorized to access the service and application component in real time (e.g., at or substantially close to the time the communication device presents the encrypted token to the application component). Based at least in part on the results of analyzing the subscriber-related information, the authorization component can determine whether the communication device and/or associated user are authorized to access the requested service and associated application component.

In response to determining that the communication device and/or associated user are not authorized to access the service and associated application component (e.g., due to the subscriber or account status being suspended, terminated, or non-existent), the authorization component can communicate not-validated information (or not-authorized information) to the application component to notify the application component that the communication device and/or associated user are not validated or authorized to access the requested service or application component. In response to receiving the not-validated information (or not-authorized information), the application component can deny the communication device and/or associated user access to the service as well as access to the application component.

If, instead, the authorization component determines that the communication device and/or associated user are authorized to access the requested service and application component (e.g., the subscriber or account status is active with regard to the service), the authorization component can communicate validation-related information, including a permitted portion of the subscriber-related information associated with the communication device and/or user, to the application component. The authorization component can determine the permitted portion of the subscriber-related information to which the application component is permitted to have, based at least in part on a defined trust level associated with the application component. In response to receiving the validation-related information, the application component can allow the communication device and/or associated user access to the service and the application component, in accordance with the subscriber or account status, service plan, etc., associated with the communication device and/or user.

These and other aspects and embodiments of the disclosed subject matter will now be described with respect to the drawings.

Referring now to the drawings, FIG. 1 illustrates a block diagram of an example system 100 that can desirably control authorization and authentication for access to an application component (e.g., an application or configuration server) and associated service by a communication device and/or an associated user, in accordance with various aspects and embodiments of the disclosed subject matter. The system 100 can include a communication network 102 that can comprise a mobility core network (e.g., a wireless communication network) and/or a packet data network (e.g., an IP-based network, such as the Internet and/or intranet) that can be associated with the mobility core network. In some embodiments, the communication network 102 can be or can comprise a service provider (SP) network, wherein the SP network can be associated with the mobility core network and/or the packet data network, and/or wherein certain components or devices can be part of the mobility core network and the SP network, as more fully described herein. In some embodiments, the SP network can comprise or can be an SP core network. The SP network can be associated with one or more service providers that each can provide one or more services (e.g., communication or other services) to communication devices, such as, for example, communication device 104, and associated users.

The mobility core network of the communication network 102 can operate to enable wireless communication between communication devices and/or between a communication device and the communication network 102. The communication network 102 can include various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, . . . ) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can include multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can include, or can be associated with (e.g., communicatively connected to) a network device of the communication network 102.

At given times, one or more communication devices, such as, for example, communication device 104, can connect or attempt to connect to the communication network 102 to communicate with the communication network 102 and/or communicate with other communication devices associated with the communication network 102. A communication device (e.g., 104) also can be referred to as, for example, a device, a mobile device, or a mobile communication device. The term communication device can be interchangeable with (or include) a UE or other terminology. A communication device (or UE, device, . . . ) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, . . . , having wireless communication functionality), a set-top box, an IP television (IPTV), a device associated or integrated with a vehicle (e.g., automobile, airplane, bus, train, or ship, . . . ), a virtual assistant (VA) device, a drone, a home or building automation device (e.g., security device, climate control device, lighting control device, . . . ), an industrial or manufacturing related device, a farming or livestock ranch related device, and/or any other type of communication devices (e.g., other types of IoTs). It is to be appreciated and understood that, while the communication devices (e.g., 104), as described herein with regard to various embodiments, can be wireless communication devices that can connect to the communication network 102 via a wireless communication connection, in certain embodiments, a communication device can connect to the communication network 102 via a wireline communication connection, wherein such communication device can comprise functionality to utilize all or at least some of the various communication services that can be accessed via the communication network 102 (e.g., communication services that can be accessed via the SP network), such as described herein.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio access bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can include various network components or devices, which can include one or more base stations, such as, for example, base station 106. For instance, the mobility core network can include one or more radio access networks (RANs) (not explicitly shown in FIG. 1), wherein each RAN can include one or more base stations (e.g., access points (APs)), such as, for example base station 106. Each base station (e.g., base station 106) can serve communication devices (e.g., communication device 104) located in respective coverage areas served by respective base stations in the mobility core network of the communication network 102. The respective base stations can be associated with one or more sectors (not shown), wherein respective sectors can comprise respective cells. For instance, the base station 106 can comprise or be associated with one or more cells (not explicitly shown in FIG. 1). The cells can have respective coverage areas that can form the coverage area covered by the one or more sectors. The respective communication devices (e.g., communication device 104) can be communicatively connected to the communication network 102 via respective wireless or wireline communication connections with one or more of the respective cells.

In some embodiments, a RAN can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN. In certain embodiments, the RAN can be a cloud-RAN (C-RAN) that can be located in or associated with a cloud computing environment, which can include various cloud network components of the communication network 102.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

In some embodiments, the system 100 can comprise an application component 108 (e.g., application server) that can provide one or more services, such as service 110, to communication devices (e.g., communication device 104) associated with (e.g., communicatively connected to) the communication network 102 (e.g., the SP network of the communication network 102). The application component 108 can be part of or associated with (e.g., communicatively connected to) the communication network 102 (e.g., part of or associated with the SP network of the communication network 102). In certain embodiments, the application component 108 can be or can comprise a configuration component (e.g., configuration server). In accordance with various embodiments, the application component 108 can be or can comprise a physical application component (e.g., a physical or hardware application server or device), or can be or can comprise a virtual application component (e.g., an application component that can share hardware and software resources with other virtual components, such as virtual servers), or can be a combination thereof.

In some embodiments, the application component 108 can be an internal application component that can be owned or managed by an internal carrier (e.g., mobile network operator (MNO) and service provider that can operate the communication network 102, or portion thereof (e.g., the mobility core network). In other embodiments, the application component 108 can be an external application component that can be owned or managed by a third-party service provider, and can be external to, and communicatively connected to, the mobility core network and the MNO service domain.

In accordance with various embodiments, the system 100 can comprise (e.g., optionally can comprise) a configuration component 112 (e.g., configuration server) that can be associated with (e.g., communicatively connected to) the application component 108. If the system 100 includes the configuration component 112, the configuration component 112 can facilitate controlling access to the service 110 by communication devices, such as communication device 104, and facilitate configuration of a communication device to enable use of the service 110 when the communication device is authorized to use the service 110, and the application component 108 can facilitate providing the service 110 to a communication device that is authorized to use the service 110. While one application component 108 is depicted in FIG. 1, in some embodiments, there can be multiple application components respectively associated with multiple services, and the configuration component 112 can be associated with (e.g., communicatively connected to) the multiple application components, and can facilitate controlling access to the respective services of or associated with the respective application components by communication devices.

The configuration component 112 can be part of or associated with (e.g., communicatively connected to) the communication network 102 (e.g., part of or associated with the SP network of the communication network 102). In accordance with various embodiments, the configuration component 112 can be or can comprise a physical configuration component (e.g., a physical or hardware configuration server or device), or can be or can comprise a virtual configuration component (e.g., a configuration component that can share hardware and software resources with other virtual components, such as virtual servers), or can be a combination thereof.

In some embodiments, the configuration component 112 can be an internal configuration component that can be owned or managed by an internal carrier (e.g., MNO) and service provider that can operate the communication network 102, or portion thereof (e.g., the mobility core network). In other embodiments, the configuration component 112 can be an external configuration component that can be owned or managed by a third-party service provider, and can be external to, and communicatively connected to, the mobility core network and the MNO service domain.

The service 110 can comprise, for example, voice, data, or messaging services and applications to facilitate communication of information between communication devices (e.g., between communication device 104 and the application component 108; or between communication device 104 and another communication device as facilitated by the application component 108 and the service 110) or performing other desired functions. For example, the service 110 (e.g., as facilitated and provided by the application component 108) can be or can comprise rich communication services (RCS) that can be utilized by the communication device (e.g., communication device 104, when authorized) to communicate enhanced (e.g., richer or advanced) messages (e.g., voice, text, or multimedia messages; or chat messaging or group chat messaging), perform IP voice calling, perform IP video calling, or communicate content, files, or other information (e.g., communicate content or files through content sharing or file sharing; or communicate location information via location services).

The system 100 also can comprise an authorization component 114 (e.g., authorization server) that can perform various authorization, authentication, cryptographic, data security, service security, and/or subscription-related functions or operations. The authorization component 114 can desirably (e.g., efficiently, securely, and/or optimally) control authorization and authentication for access the one or more services (e.g., service 110) associated with the application component 108 by a communication device (e.g., communication device 104) and/or an associated user attempting to access the service(s), such as service 110.

In some embodiments, the authorization component 114 can be or can comprise an OIDC server. The OIDC server can comprise an OIDC layer, which can be an authentication layer that can be associated with (e.g., on top of) an authorization framework (e.g., OAuth 2.0 or subsequent OAuth framework, or other desired authorization framework) that can employ a desired authorization and/or authentication protocol(s) (e.g., OAuth 2.0 protocol or subsequent OAuth protocol, or other desired authorization and/or authentication protocol(s)). In accordance with various embodiments, the authorization component 114 can be or can comprise a physical authorization component (e.g., a physical or hardware authorization server or device), or can be or can comprise a virtual authorization component (e.g., an authorization component that can share hardware and software resources with other virtual components, such as virtual servers), or can be a combination thereof. The authorization component 114 can be part of the mobility core network and the SP network of the communication network 102. The authorization component 114 can be an internal authorization component that can be owned or managed by an internal carrier (e.g., MNO) that can operate the communication network 102, or portion thereof (e.g., the mobility core network).

Figure 2:
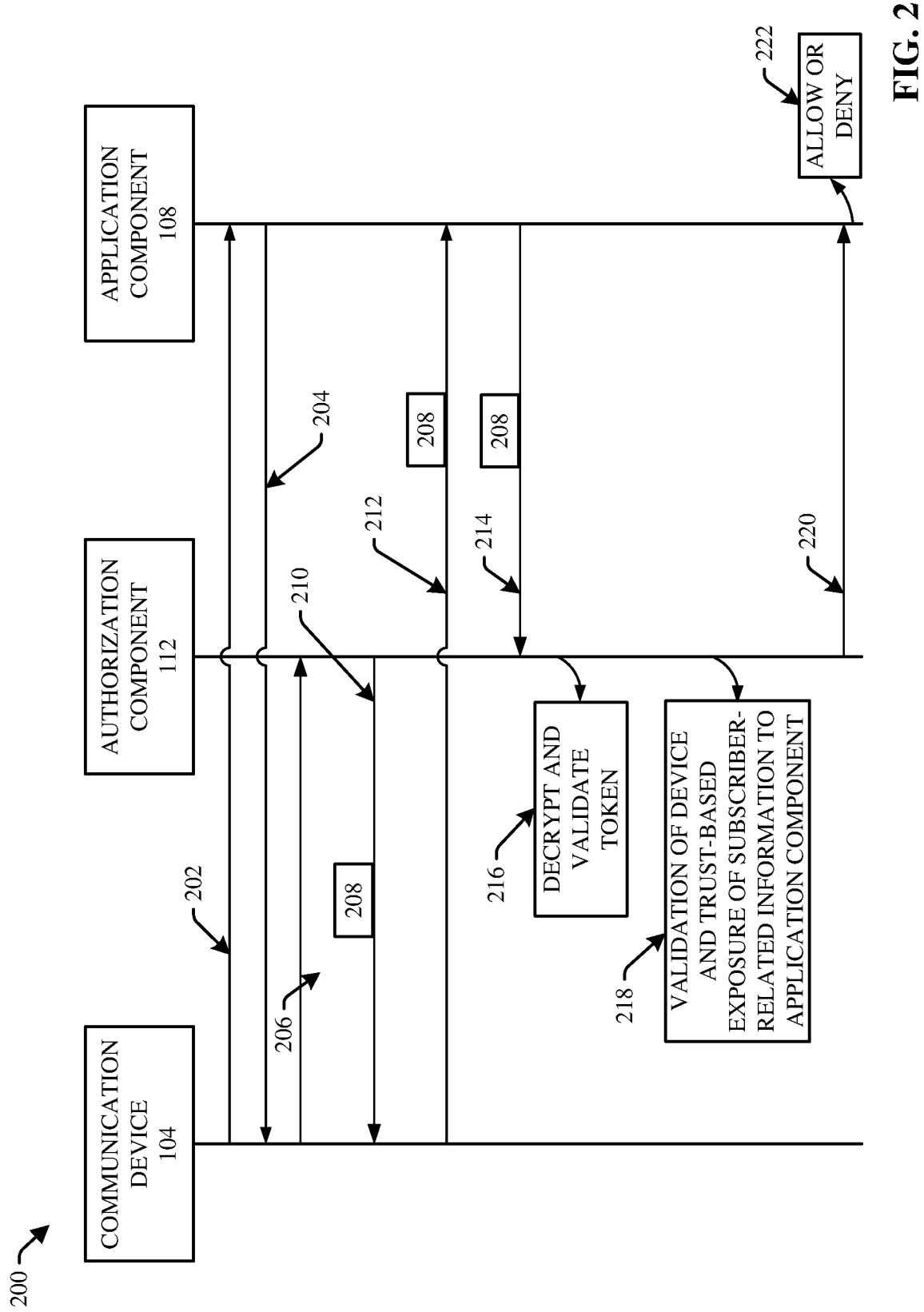
FIG. 2 depicts a diagram of an example authorization flow that can desirably control authorization and authentication for access to a service and associated application component by a communication device and/or an associated user, in accordance with various aspects and embodiments of the disclosed subject matter.

Referring to FIG. 2 (along with FIG. 1), FIG. 2 depicts a diagram of an example authorization flow 200 that can desirably control authorization and authentication for access to a service (e.g., service 110) and associated application component 108 by a communication device (e.g., communication device 104) and/or an associated user, in accordance with various aspects and embodiments of the disclosed subject matter. As indicated at reference numeral 202 of the authorization flow 200, if the communication device 104 (e.g., device or associated user) desires to utilize the service 110, the communication device 104 can generate a service request, which can request access and use of the service 110, and can communicate the service request to the application component 108 (or configuration component 112, if the system 100 employs a configuration component 112 separate from the application component 108). In some embodiments, the service request can comprise a client configuration request to request configuration of a client of the communication device 104 to enable use the desired service 110.

In response to the service request, the application component 108 (or configuration component 112) can generate a redirect message, and can communicate the redirect message to the communication device 104, wherein the redirect message can instruct or inform (e.g., notify) the communication device 104 to authenticate with the authorization component 114, as indicated at reference numeral 204 of the authorization flow 200.

The communication device 104 can generate an authentication request message and can communicate the authentication request message to the authorization component 114, and the authorization component 114 can receive the authentication request message, as indicated at reference numeral 206 of the authorization flow 200. The authentication message can request that the communication device 104 and/or associated user obtain authentication information (e.g., obtain an authentication token or packet, or other authentication credential) to facilitate gaining access and use of the service 110.

In response to the authentication request message, the authorization component 114 can generate an encrypted token 208 (e.g., an encrypted authentication token or packet, which also can be referred to as an access token or packet), which can comprise device identifier information associated with (e.g., identifying) the communication device 104 and/or associated user, and can communicate the encrypted token 208, comprising encrypted device identifier information, to the communication device 104, as illustrated at reference numeral 210 of the authorization flow 200. The authorization component 114 can obtain the device identifier information from the communication device 104 and/or can obtain or verify the device identifier information associated with the communication device 104 from a subscriber database of or associated with the authorization component 112. The authorization component 114 can generate the encrypted token 208, based at least in part on an encryption key (e.g., private encryption key), an initialization vector, and a desired cryptographic (e.g., encryption) algorithm, in accordance with a desired authorization, authentication, and/or cryptographic protocol(s). In accordance with various embodiments, the encrypted token 208 can be an extensible authentication protocol (EAP)-authentication and key agreement (AKA) or OIDC generated token, which can comprise the device identifier information (e.g., encrypted device identity) associated with the communication device 104, wherein the authorization component 114 can generate the EAP-AKA or OIDC token, based at least in part on the encryption key, initialization vector, and desired encryption algorithm, in accordance with an EAP-related or OIDC-related protocol.

The initialization vector can be an arbitrary number, value, or variable, such as a random or pseudorandom number, value, or variable, which can be (or may not be) comparable in length to the encryption key. In some embodiments, the authorization component 114 can employ a random or pseudorandom number generator to generate the initialization vector in connection with encrypting the desired information, including the device identifier information, and generating the encrypted token 208.

In response to receiving the encrypted token 208, the communication device 104 can communicate a service request, comprising the encrypted token 208, to the application component 108 (or configuration component 112), as indicated at reference numeral 212 of the authorization flow 200. In response to receiving the service request, comprising the encrypted token 208, the application component 108 (or configuration component 112) can parse the service request to retrieve the encrypted token 208 from the service request. In connection with the service request for the service 210, the application component 108 (or configuration component 112) can forward (e.g., communicate) the encrypted token 208 to the authorization component 114 for validation (e.g., verification) by the authorization component 114, as indicated at reference numeral 214 of the authorization flow 200.

In response to receiving the encrypted token 208, the authorization component 114 can decrypt the encrypted token 208 and determine whether the token 208 is validated (e.g., determine whether to approve or reject the token 208), and whether the associated communication device 104 and/or user are validated, as indicated at reference numeral 216 of the authorization flow 200. To facilitate validation of the encrypted token 208, the communication device 104, and/or the associated user, the authorization component 114 can analyze and decrypt the encrypted token 208, including the encrypted device identifier information, based at least in part on a private (e.g., secret) decryption key, the initialization vector, and a desired cryptographic (e.g., decryption) algorithm. The initialization vector can be the same as the initialization vector utilized to generate the encrypted token 208, the private decryption key can correspond to the encryption key utilized to generate the encrypted token 208, and the decryption algorithm can correspond to the encryption algorithm utilized to generate the encrypted token 208. The authorization component 114 can analyze the decrypted information, including the decrypted device identifier information, to facilitate determining whether the token 208 is valid, such as described herein. In some embodiments, the authorization component 114 can control access to the private decryption key, cryptographic algorithm, and/or initialization vector, for example, by not sharing the private decryption key, cryptographic algorithm, and/or initialization vector with the application component 108 (or configuration component 112) or other entities (e.g., other application components, other configuration components, communication device 104, or users, . . . ).

The authorization component 114 can perform validation of the token 208, and the associated communication device 104 and/or associated user, and trust-based subscriber information exposure to the application component 108 (or configuration component 112), as indicated at reference numeral 218 of the authorization flow 200. In some embodiments, the authorization can perform such validation and trust-based subscriber information exposure to the application component 108 (or configuration component 112) in real time or substantially in real time. As indicated at reference numeral 220 of the authorization flow, in response to validating the token 208 and the associated communication device 104 and/or user and determining a permitted portion of the subscriber-related information that can be provided to the application component 108, the authorization component 114 can communicate validation-related information, including the permitted portion of the subscriber-related information, to the application component 108 (or configuration component 112); or alternatively, in response to determining that the token 208 and/or the associated communication device 104 and/or user are not validated (e.g., the token 208 is invalid and/or the communication device 104 is not authorized to access and utilize the service 110), the authorization component 114 can communicate not-validated information to the application component 108 (or configuration component 112). As indicated at reference numeral 222 of the authorization flow 200, in response receiving the validation-related information, including the permitted portion of the subscriber-related information, the application component 108 (or configuration component 112) can allow the communication device 104 and/or associated user to access and use the requested service 110 (e.g., in accordance with the service subscription associated with the communication device 104); or alternatively, in response receiving the not-validated information, the application component 108 (or configuration component 112) can deny the communication device 104 and/or associated user access to the service 110.

With further regard to the operations associated with reference numerals 218, 220, and 222 of the authorization flow 200, the authorization component 114 can determine whether the token 208 is authenticated, and accordingly whether the communication device 104 and/or associated user are authenticated, based at least in part on the results of decrypting the encrypted token 208, including the decrypted information, comprising the decrypted device identifier information, obtained from decrypting the encrypted token 208. As some examples, if the authorization component 114 is unable to decrypt the encrypted token 208 based at least in part on the private decryption key, initialization vector, and decryption algorithm, or if the authorization component 114 determines that the decrypted information, including the device identifier information, is not proper (e.g., the decrypted information, including the device identifier information, does not match the information that is supposed to be in the token 208), the authorization component 114 can determine that the token 208 is not authenticated, and accordingly, the communication device 104 and/or associated user are not authenticated.

If, based at least in part on the decryption of the encrypted token 208 and the analysis of the decrypted information, including the device identifier information, the authorization component 114 determines that token 208 is not authenticated, and accordingly, the communication device 104 and/or associated user are not authenticated, the authorization component 114 can generate not-validated information that can indicate that the token 208, and accordingly, the communication device 104 and/or user, are not validated and the communication device 104 and/or user are not authorized to access and utilize the requested service 110. The authorization component 114 can communicate the not-validated information to the application component 108 (or configuration component 112) to notify the application component 108 (or configuration component 112) that the communication device and/or associated user are not validated. In response to receiving the not-validated information, the application component 108 (or configuration component 112) can deny the communication device 104 and/or associated user access to the service 110 as well as access to the application component 108.

If, instead, the authorization component 114 is able to decrypt (e.g., successfully decrypt) the encrypted token 208 based at least in part on the private decryption key, initialization vector, and decryption algorithm, and if the authorization component 114 determines that the decrypted information, including the device identifier information, is proper (e.g., the decrypted information, including the device identifier information, matches the information that is supposed to be in the token 208), the authorization component 114 can determine that the token 208 is authenticated, and accordingly, the communication device 104 and/or associated user are authenticated. In response to determining that the token 208 and associated communication device 104 are authenticated, the authorization component 114 can proceed to determine whether the communication device 104 and/or the associated user are authorized to access and utilize the service 110, as requested, based at least in part on subscriber-related information (e.g., subscriber identification information, subscription or account status information, or service plan information, . . . ) that the authorization component 114 can retrieve from the subscriber database of the data store.

The subscriber identification information can comprise user identification information, such as, for example, the name of a user, residential address of the user, phone number of the user, email address of the user, authentication information or credentials (e.g., username of the user with regard to an account or subscription, and/or password, passcode, or personal identification number (PIN) of the user), and/or communication device information, such as, for example, a device identifier (e.g., international mobile subscriber identity (IMSI), mobile station international subscriber directory number (MSISDN), media access control (MAC) address, IP address, device serial number, a transaction identifier (transaction ID) (e.g., relating to the transaction associated with the communication device attempting to access the service), other device identifier (device ID), or an item of data agnostic or unrelated to the communication device but which can be associated with the communication device to identify the communication device) that can identify the communication device (e.g., 104) and/or authentication information or credentials associated with the communication device or associated user. The subscription or account status information can indicate the status of the communication device and/or associated user with respect to the service (e.g., service 110). The status can comprise an active status that can indicate the communication device (e.g., 104) and/or associated user has a subscription or account for the service that is active and/or authorized; an inactive status that can indicate the communication device and/or associated user has a subscription or account for the service that is not active and/or not authorized; a terminated status that can indicate the subscription or account for the service has been terminated and the communication device and/or associated user are not authorized to access or utilize the service; a suspended status that can indicate the subscription or account for the service has been suspended and the communication device and/or associated user are currently not authorized to access or utilize the service; and/or a non-existent status that can indicate that the communication device and/or user does not have a subscription or account for the service. The service plan information can indicate the level of service and/or the particular services (e.g., portion of the services) of the service (e.g., service 110) that can be available to the communication device and/or user via the subscription or account of the communication device and/or user.

The authorization component 114 can analyze the subscriber-related information to determine a subscriber or account status (e.g., active status, suspended status, terminated status, or non-existent status), a service(s) (e.g., service 110) to which the user is subscribed or with which the user has an account, and/or type of service plan associated with the service, etc. For instance, the authorization component 114 can determine the real-time (or substantially real-time) subscriber or account status of the communication device 104 and/or user so that the authorization component 114 can know in real time whether the communication device 104 and/or user are authorized to access the requested service 110 and application component 108 in real time (e.g., at or substantially close to the time the communication device 104 presents the encrypted token 208 to the application component 108 (or configuration component 112)). Based at least in part on the results of analyzing the subscriber-related information, the authorization component 114 can determine whether the communication device 104 and/or associated user are authorized to access the requested service 110 and associated application component 108.

If, based at least in part on the results of analyzing the subscriber-related information associated with the communication device 104 and/or user, the authorization component 114 determines that the communication device 104 and/or associated user are not authorized to access the service 110 and associated application component 108 (e.g., due to the subscriber or account status being inactive, suspended, terminated, or non-existent), the authorization component 114 can generate not-validated information (or not-authorized information) that can indicate that the communication device 104 and/or user are not validated or are otherwise not authorized to access the service 110 and associated application component 108. The authorization component 114 can communicate the not-validated information (or not-authorized information) to the application component 108 (or configuration component 112) to notify the application component 108 (or configuration component 112) that the communication device 104 and/or associated user are not validated or authorized to access the requested service 110 or application component 108. In response to receiving the not-validated information (or not-authorized information), the application component 108 (or configuration component 112) can deny the communication device 104 and/or associated user access to the service 110 as well as access to the application component 108.

If, instead, based at least in part on the results of analyzing the subscriber-related information associated with the communication device 104 and/or user, the authorization component 114 determines that the communication device 104 and/or associated user are authorized to access the requested service 110 and application component 108 (e.g., because the subscriber status is currently active with regard to the service 110), the authorization component 114 can generate validation-related information that can indicate that the communication device 104 and/or associated user are authorized to access and utilize the service 110 as well as the application component 108. Also, the authorization component 114 can determine a permitted portion of the subscriber-related information associated with the communication device 104 and/or user that the application component 108 (or configuration component 112) is permitted (e.g., authorized or allowed) to have, based at least in part on the results of analyzing the subscriber-related information associated with the communication device 104 and/or user, and a defined trust level associated with the application component 108 (or configuration component 112). The defined trust level can indicate what type(s) of subscriber-related information associated with the communication device 104 and/or user that the application component 108 (or configuration component 112) is authorized to have. The authorization component 114 can include the permitted portion of the subscriber-related information in the validation-related information. The authorization component 114 can communicate the validation-related information, including the permitted portion of the subscriber-related information associated with the communication device 104 and/or user, to the application component 108 (or configuration component 112).

In response to receiving the validation-related information, the application component 108 (or configuration component 112) can allow the communication device 104 and/or associated user access to the service 110 and the application component 108, in accordance with the subscriber or account status, service plan, etc., associated with the communication device 104 and/or user. In accordance with various embodiments, the application component 108 (or configuration component 112) can generate configuration information and/or configuration control information, and/or can generate a desired token value (e.g., a token parameter in the token characteristic), to facilitate configuration of the communication device 104 (e.g., the client of the communication device 104) and use of the desired service 110. In some embodiments, the application component 108 (or configuration component 112) can employ a desired format in connection with generating the configuration information and/or configuration control information to generate formatted configuration information, formatted configuration control information, and/or formatted token value. For example, the application component 108 (or configuration component 112) can generate a configuration extensible markup language (XML) document that can comprise configuration information, configuration control information, and/or a token value in XML format. In other embodiments, the application component 108 (or configuration component 112) can utilize another type of document or information format to facilitate generating the formatted configuration information, formatted configuration control information, and/or formatted token value. The application component 108 (or configuration component 112) can communicate a message (e.g., an approval or OK message), which can comprise the configuration information, configuration control information, and/or token value (e.g., a configuration XML document comprising such information), to the communication device 104.

The communication device 104 can receive the message, comprising the configuration-related information) from the application component 108 (or configuration component 112). The communication device 104 can be configured (e.g., the client of the communication device 104 can be configured) based at least in part on the configuration information, configuration control information, and/or token/token value. The communication device 104 can utilize the service 110, in accordance with the configuration-related information and permissions (e.g., permissions to use the service 110).

The disclosed subject matter, by employing the authorization component 114 and the techniques, methods, and algorithms described herein, can desirably (e.g., suitably or optimally) control authorization and authentication for access a service (e.g., service 110) and associated application component 108 by a communication device 104 and/or an associated user, such as described herein. The disclosed subject matter can enhance (e.g., improve or optimize) security with regard to access to services to ensure that only communication devices and/or associated users that are currently authorized to access a service are able to access the service. The disclosed subject matter, by employing the authorization component 114 and the techniques, methods, and algorithms described herein, can prevent an unauthorized, malicious, or fake (e.g., spoofing) communication device from gaining unauthorized access to a service (e.g., service 110), even if such communication device steals a token (e.g., encrypted token) from an original communication device on a wireless communication channel and attempts to present the stolen token to the application component 108 (e.g., configuration server or third-party application server), or attempts to create a counterfeit token and use the counterfeit token. Since the authorization component 114 can verify the token itself, the authorization component 114 can identify a stolen or counterfeit token presented by an unauthorized communication device and thereby can prevent or facilitate preventing unauthorized access of the service by the unauthorized communication device.

The disclosed subject matter, by employing the authorization component 114 and the techniques, methods, and algorithms described herein, also can enhance securing and controlling access to a service 110 by a communication device 104 when there is a gap between issuance of the token (e.g., encrypted token) and submission of the token to the application component 108 (or configuration component 112) to facilitate preventing the communication device 104 from gaining unauthorized access to the service 110 due, for example, to the subscriber or account status associated with the communication device 104 becoming inactive (e.g., terminated or suspended) with regard to the service 110 in between the time of issuance of the token by the authorization component 114 and submission of the token to the application component 108 (or configuration component 112) by the communication device 104. The authorization component 114, when validating the token, also can check and determine the subscriber or account status of the communication device 104 and/or associated user in real time or substantially in real time, and can provide the application component 108 (or configuration component 112) a real-time or substantially real-time update regarding the subscriber or account status of the communication device 104 and/or user with regard to the requested service 110 to ensure that only an authorized communication device and/or user (e.g., with an active status) can gain access to the service 110. Thus, by performing such real-time status checks, the authorization component 114 can identify or catch instances when there has been a change in subscriber or account status of a communication device 104 with regard to a requested service in between the time of issuance of the token by the authorization component 114 and submission of the token to the application component 108 (or configuration component 112) by the communication device 104. Otherwise, if the application component 108 (or configuration component 112) did not have a real-time update regarding the subscription or account status of the communication device, and the subscriber or account status turns out to be inactive, the application component 108 (or configuration component 112) may undesirably (e.g., inadvertently or inappropriately) allow the communication device 104 to gain access to the service 110, even though the communication device 104 is not authorized to have access to the service 110.

The disclosed subject matter, by employing the authorization component 114 and the techniques, methods, and algorithms described herein, also can enhance security of cryptographic information to ensure that private decryption keys, initialization vectors, and cryptographic algorithms (e.g., encryption and decryption algorithms) are not shared with outside entities (e.g., application components, configuration components, communication devices, or other unauthorized entities), whether an entity is trusted or untrusted, whether an entity is a third-party entity or is part of an internal carrier (e.g., internal carrier owning, managing, or operating the mobility core network, SP network, and authorization component 114) or is an internal carrier partner. The authorization component 114 can perform the encryption of the token, including the information (e.g., device identifier information) therein, and also can perform the decryption of the encrypted token when such token is presented to the authorization component 114 by the application component 108 (or configuration component 112), without sharing the private decryption keys, initialization vectors, and cryptographic algorithms with those outside entities. The disclosed subject matter can thereby avoid undesirable security risks that can be associated with sharing private decryption keys, initialization vectors, and/or cryptographic algorithms with outside entities.

Further, the disclosed subject matter, by employing the authorization component 114 and the techniques, methods, and algorithms described herein, can enhance security of and control the sharing of subscriber-related information (e.g., communication device and/or user-related information) to ensure that entities (e.g., application or configuration servers, whether third-party or whether part of or partnered with the internal carrier) are only able to access and receive certain subscriber-related information that such entities are permitted to access, based at least in part on respective defined trust levels associated with such entities, while not being able to access or receive other subscriber-related information that such entities are not permitted to access. Furthermore, the disclosed subject matter, by employing the authorization component 114 and the techniques, methods, and algorithms described herein, can generate an encrypted token that can desirably include minimal information (e.g., a relatively small desired amount of information, such as device identifier information, as described herein). This can enable the application component 108 (or configuration component 112) to desirably (e.g., quickly, efficiently, and suitably) process the encrypted token, in part, since the encrypted token does not include a large amount of encrypted information to process, while the authorization component 114 also can desirably not include any subscriber-related information associated with the communication device or user in the encrypted token that the application component 108 (or configuration component 112) is not permitted to have. Accordingly, this can enable the application component 108 (or configuration component 112) to desirably process the encrypted token to facilitate performing operations relating to authorizing and provisioning a requested service for the communication device. Moreover, the disclosed subject matter, by employing the authorization component 114 and the techniques, methods, and algorithms described herein, can enhance securing access to services and information (e.g., subscriber-related information) at a granular level to enable desirable implementation with internal carrier entities and external third-party entities (e.g., third-party application servers).

Figure 3:
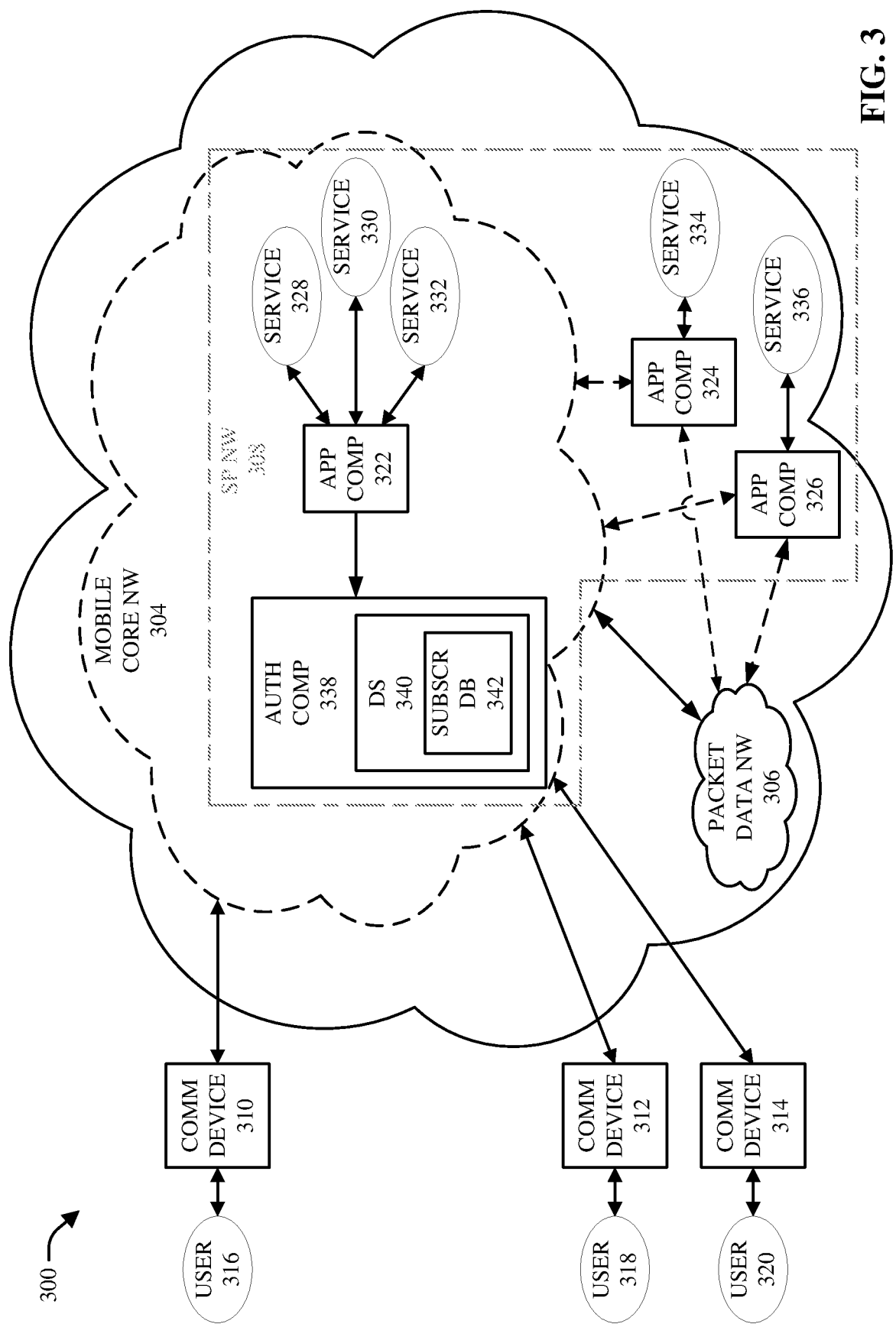
FIG. 3 depicts a block diagram of an example system that can desirably control authorization and authentication for access to respective services and respective application components by communication devices and/or associated users, in accordance with various aspects and embodiments of the disclosed subject matter.

Referring to FIG. 3, FIG. 3 depicts a block diagram of an example system 300 that can desirably control authorization and authentication for access to respective services and respective application components by communication devices and/or associated users, in accordance with various aspects and embodiments of the disclosed subject matter. The system 300 can comprise a communication network (COMM NW) 302 that can comprise a mobility core network (e.g., a wireless communication network) 304 and a packet data network 306 (e.g., an IP-based network) that can be associated with the mobility core network 304. In some embodiments, the mobility core network 304 can be or can comprise an SP network 308, as more fully described herein.

At given times, one or more communication devices (e.g., mobile, wireless, and/or smart phone, computer, electronic pad or tablet, electronic bodywear, or IoT device), such as, for example, communication device (COMM DEV) 310, communication device 312, and/or communication device 314, can connect or attempt to connect to the communication network 302 to communicate with the communication network 302 and/or communicate with other communication devices associated with the communication network 302. The respective communication devices (e.g., 310, 312, 314, . . . ) can be associated with (e.g., owned or operated by) respective users, such as, for example, user 316, user 318, and user 320. It is to be appreciated and understood that, in some embodiments, the respective communication devices (e.g., 310, 312, 314, . . . ) can be associated with (e.g., communicatively connected to) the communication network 302 and associated components (e.g., application component, or authorization component, . . . ) via one or more respective base stations of or associated with the communication network 302 (e.g., associated with the mobility core network 304 of the communication network 302). However, for reasons of brevity and clarity, the one or more base stations are not explicitly shown in FIG. 3, but such base stations can be as described herein and as otherwise shown in the drawings.

The system 300 can comprise a desired number of application components (e.g., application servers and/or configuration servers), including application component (APP COMP) 322, application component 324, and application component 326, that can be part of or associated with the communication network 302 (e.g., part of or associated with the SP network 308 of the communication network 302). The respective application components (e.g., 322, 324, and/or 326, . . . ) can be associated with, and can provide or facilitate providing, one or more respective services (e.g., communication services or applications, and/or other desired services or applications) to respective communication devices (e.g., 310, 312, and/or 314, . . . ) and/or associated users (e.g., 316, 318, and/or 320, . . . ). For instance, the application component 322 can be associated with, and can provide or facilitate providing, service 328, service 330, and service 332 to communication devices (e.g., communication device 310) and/or associated users (e.g., user 316); the application component 324 can be associated with, and can provide or facilitate providing, service 334 to communication devices (e.g., communication device 312) and/or associated users (e.g., user 318); and the application component 326 can be associated with, and can provide or facilitate providing, service 336 to communication devices (e.g., communication device 314) and/or associated users (e.g., user 320).

In certain embodiments, an application component(s) (e.g., application component 322, 324, and/or 326) can be or can comprise a configuration component(s) (e.g., configuration server). In other embodiments, the system 300 can comprise a configuration component(s) that can be associated with (e.g., communicatively connected to) an application component(s) (e.g., as depicted in FIG. 1, and as described herein). For reasons of brevity and clarity though, a separate configuration component is not explicitly depicted in FIG. 3, although various functionalities of the configuration component are described herein with regard to the application component(s) (e.g., application component 322, 324, and/or 326). In accordance with various embodiments, an application component(s) (e.g., application component 322, 324, and/or 326) can be or can comprise a physical application component (e.g., a physical or hardware application server or device), or can be or can comprise a virtual application component (e.g., an application component that can share hardware and software resources with other virtual components, such as virtual servers), or can be a combination thereof.

In some embodiments, an application component (e.g., application component 322) can be an internal application component that can be owned, operated, or managed by an internal carrier (e.g., MNO) and service provider that can operate the communication network 302, or portion thereof, including the mobility core network 304 and the SP network 308. In other embodiments, an application component, such as, for example, application component 324 or application component 326, can be an external application component that can be owned, operated, or managed by a third-party service provider, can be part of the SP network 308, and can be associated with (e.g., communicatively connected to) the mobility core network 304 and/or packet data network 306.

The respective services (e.g., service 328, service 330, service 332, service 334, and/or service 336) can comprise respective communication services. In some embodiments, one or more of the respective services can be or can comprise RCS. The respective services can comprise or relate to, for example, a voice communication service (e.g., cellular, wireless, and/or voice over IP (VoIP) voice communication service, voice chat messaging), a voice mail service, a data communication service (e.g., text messaging, short message service (SMS), multimedia messaging service (MMS), and/or RCS), an email service, a social media service (e.g., social media service of or relating to a social media network), a video streaming service (e.g., movie streaming service, television program streaming service, music video streaming service, or other type of video streaming service), an audio streaming service (e.g., a music streaming service, a book-to-audio streaming service, a radio broadcast type of service, or other type of audio service), an entertainment-related service, an electronic gaming service, a map service (e.g., geographical mapping and/or traveling directions service), a news service, a financial or banking service, a user health-related service, a user exercise-related service, a remote desktop service, a language translation service, a transcription service (e.g., voice-to-text transcription service, text-to-voice transcription service), an online marketplace service, an online store service, a restaurant or food service, a weather service, and/or another desired type of service. For example, service 328 can be or can provide one or more of the above-referenced types of services, service 336 can be or can provide one or more other types of services of the above-referenced types of services, etc.

The system 300 also can comprise an authorization component (AUTH COMP) 338 (e.g., authorization server) that can perform various authorization, authentication, cryptographic, data security, service security, and/or subscription-related functions or operations, such as more fully described herein. The authorization component 338 can be owned or managed by the internal carrier and service provider, which can operate the communication network 302, or portion thereof, including the mobility core network 304 and the SP network 308. The authorization component 338 can desirably (e.g., efficiently, securely, and/or optimally) control authorization and authentication for access to the respective application components (e.g., application components 322, 324, 326, . . . ) and the one or more respective services (e.g., services 328 through 336) associated therewith by respective communication devices (e.g., communication devices 310, 312, 314, . . . ) and/or an associated users (e.g., users 316, 318, 320, . . . ) attempting to access the respective application components and respectively associated services.

In accordance with various embodiments, the authorization component 338 can be or can comprise a physical authorization component (e.g., a physical or hardware authorization server or device), or can be or can comprise a virtual authorization component (e.g., an authorization component that can share hardware and software resources with other virtual components, such as virtual servers), or can be a combination thereof. In some embodiments, the authorization component 338 can be or can comprise an OIDC server, such as more fully described herein.

In accordance with various embodiments, the authorization component 338 can comprise a data store (DS) 340, which can store information, including a subscriber database (SUBSCR DB) 342 (as depicted in FIG. 3), or can otherwise be associated with (e.g., communicatively connected to) the data store 340.

The subscriber database 342 can comprise respective subscriber-related information associated with respective communication devices (e.g., communication devices 310, 312, 314, . . . ) and/or respective users (e.g., users 316, 318, 320, . . . ) with regard to the respective services (e.g., services 328 through 336) and respective accounts or subscriptions for those respective services. The respective subscriber-related information can include, for example, respective user and/or communication device (e.g., subscriber) identification information, respective subscription or account status information, and/or respective service plan information, etc., associated with the respective communication devices (e.g., communication devices 310, 312, 314, . . . ) and/or the respective users (e.g., users 316, 318, 320, . . . ).

Respective application components (e.g., application components 322, 324, 326, . . . ) can have and be associated with respective trust levels with respect to (e.g., by or in relation to) the authorization component 338, associated internal carrier, and associated MNO service domain. An application component (or configuration component), such as, for example, application component 322, that is part of (e.g., physically and/or logically a member of or within) the mobility core network 304 and MNO service domain typically can be a trusted application component (or configuration component) with respect to (e.g., by or in relation to) the authorization component 338, associated internal carrier, and associated MNO service domain. In certain embodiments, some application components (or configuration components), such as, for example, application component 324 or application component 326, can be associated with (e.g., owned, operated, or managed by) a third-party service provider, and can be external to and not part of (e.g., not physically and/or logically a member of or within) the mobility core network 304, the internal carrier, and the MNO service domain, although such external application component (or external configuration component) can be part of the SP network 308 to facilitate providing services to communication devices and/or associated users. Such external application component (e.g., 326) (or external configuration component) can have a trust level that can range from trusted to untrusted (e.g., trusted, somewhat trusted to a certain degree, or untrusted) with respect to (e.g., by or in relation to) the authorization component 338, associated internal carrier, and associated MNO service domain, and respective (e.g., different) application components can have or be associated with respective trust levels with respect to the authorization component 338, associated internal carrier, and associated MNO service domain.

The authorization component 338 can know or determine a level of trust that an application component (e.g., application component 322, 324, or 326) (or configuration component) has with respect to the authorization component 338, mobility core network 304, the associated internal carrier, and the associated MNO service domain, based at least in part on application component (or configuration component)-related information associated with the application component (or configuration component, which the authorization component 338 can retrieve from the data store 340. The authorization component 338 also can determine what items of information (e.g., subscriber-related information) associated with a communication device (e.g., communication device 310, 312, or 314) and/or associated user (e.g., user 316, 318, or 320) that the application component (or configuration component) is permitted to have and/or what items of information associated with the communication device and/or user that the application component (or configuration component) is not permitted to have, based at least in part on the trust level of the application component (or configuration component), in accordance with the defined security management criteria, as more fully described herein.

In accordance with various embodiments, the authorization component 338 and the application components (e.g., 322, 324, 326, . . . ) can operate to perform respective operations and functions to determine whether the respective communication devices (e.g., 310, 312, 314, . . . ) and/or associated users (e.g., 316, 318, 320, . . . ) are authorized to access respective services (e.g., services 328 through 336), as requested by the respective communication devices, as more fully described herein. For instance, in response to receiving a service request for a service from a communication device (e.g., 310, 312, or 314), an application component (e.g., 322, 324, or 326) can redirect the communication device to the authorization component 338 to obtain authentication information (e.g., an encrypted token or packet). The communication device can request such authentication information from the authorization component 338.

In response to the communication device (e.g., 310, 312, or 314) requesting such authentication information from the authorization component 338, the authorization component 338 can authenticate the communication device using a desired authentication procedure and protocol, such as, for example, HTTP embedded EAP-AKA. For example, in accordance with and using the HTTP embedded EAP-AKA, the authorization component 338 can utilize AKA between the communication device (e.g., client of the device) and the authorization component 338 for authentication and session key distribution using a desired challenge-response procedure and/or mechanism that can employ symmetric cryptography. The authentication component 338 can facilitate performing the AKA between the authentication component 338 and a subscriber identity module (SIM), a UMTS or universal SIM (USIM), or an IP multimedia services identity module (ISIM) of the communication device, wherein the client (e.g., trusted client) of the communication device can have access to the SIM, USIM, or ISIM to request the AKA procedure. For example, the authentication component 338 can issue a challenge, comprising challenge information, to the communication device. The client of the communication device can generate a response, comprising response information, based at least in part on the challenge information and a cryptographic key of the SIM, USIM, or ISIM (e.g., client can apply the cryptographic key to the challenge information to generate the response information). The communication device can send the response to the authorization component 338. The authorization component 338 can determine whether the communication device is authenticated based at least in part on a result of determining whether the response to the challenge is proper.

If the communication device (e.g., 310, 312, or 314) is authenticated, and in response to authenticating the communication device, the authorization component 338 can generate the encrypted token based at least in part on an encryption key, an initialization vector, and an encryption algorithm. The encrypted token can comprise device identifier information (e.g., IMSI, MSISDN, MAC address, device serial number, transaction ID, device ID, an item of data agnostic or unrelated to the communication device but which can be associated with the communication device to identify the communication device, or other desired device identifier information associated with the communication device) associated with the communication device (e.g., 310, 312, or 314), in encrypted form. The authorization component 338 can provide (e.g., communicate, transmit) the encrypted token, comprising the encrypted device identifier information, to the communication device. The communication device can communicate a service request message, comprising the encrypted token, to the application component (e.g., 322, 324, or 326). The application component can parse the service request message to retrieve the encrypted token. The application component can communicate the encrypted token to the authorization component 338.

The authorization component 338 can decrypt the encrypted token, including the encrypted device identifier information, based at least in part on a private decryption key, the initialization vector, and a decryption algorithm, to generate decrypted information, including the device identifier information (e.g., IMSI, MSISDN, MAC address, device serial number, transaction ID, device ID, item of data, or other desired device identifier information associated with the communication device). The authorization component 338 can determine whether the token is validated, and whether the communication device (e.g., 310, 312, or 314) is authenticated and validated, based at least in part on the results of the decryption of the encrypted token and the results of analyzing the decrypted information, including the device identifier information.

If the authorization component 338 determines that the encrypted token is valid, and the communication device (e.g., 310, 312, or 314) and/or associated user (e.g., 316, 318, or 320) is authenticated (e.g., based on the encrypted token being validated), the authorization component 338 can retrieve subscriber-related information relating to the communication device and/or user from the subscriber database 342 stored in the data store 340. The authorization component 338 can analyze the subscriber-related information, in part, to determine the subscriber or account status of the communication device and/or associated user with regard to the requested service (e.g., service 328, 330, 332, 334, or 336). Based at least in part on the results of analyzing the subscriber-related information (e.g., the subscriber or account status of the communication device or user with respect to the requested service), the authorization component 338 can determine whether the communication device and/or associated user are authorized to access and utilize the requested service. If the communication device and/or user are authorized with regard to the requested service, the authorization component 338 also can determine a permitted portion of the subscriber-related information that the application component (e.g., 322, 324, or 326) is permitted to have, based at least in part on a defined trust level associated with the application component and the results of analyzing the subscriber-related information.

If the authorization component 338 determines that the encrypted token is validated, and the communication device (e.g., 310, 312, or 314) and/or associated user (e.g., 316, 318, or 320) are validated (e.g., authenticated, and authorized with regard to the requested service (e.g., service 328, 330, 332, 334, or 336)), the authorization component 338 can communicate validation-related information, comprising the permitted portion of the subscriber-related information, to the application component (e.g., 322, 324, or 326). In response to the validation-related information, the application component can allow the communication device and/or associated user to access and utilize the requested service (e.g., as indicated or specified by the subscriber-related information). The communication device and/or user can utilize the requested service, as facilitate by (e.g., via) the application component.

If, instead, the authorization component 338 determines that the encrypted token is not validated, and/or the communication device (e.g., 310, 312, or 314) and/or associated user (e.g., 316, 318, or 320) are not validated (e.g., not authenticated, and/or not authorized with regard to the requested service (e.g., service 328, 330, 332, 334, or 336)), the authorization component 338 can communicate not-validated information to the application component (e.g., 322, 324, or 326). In response to the not-validated information, the application component can deny the communication device and/or associated user access to the requested service to prevent the communication device and/or user from using the service.

Figure 4:
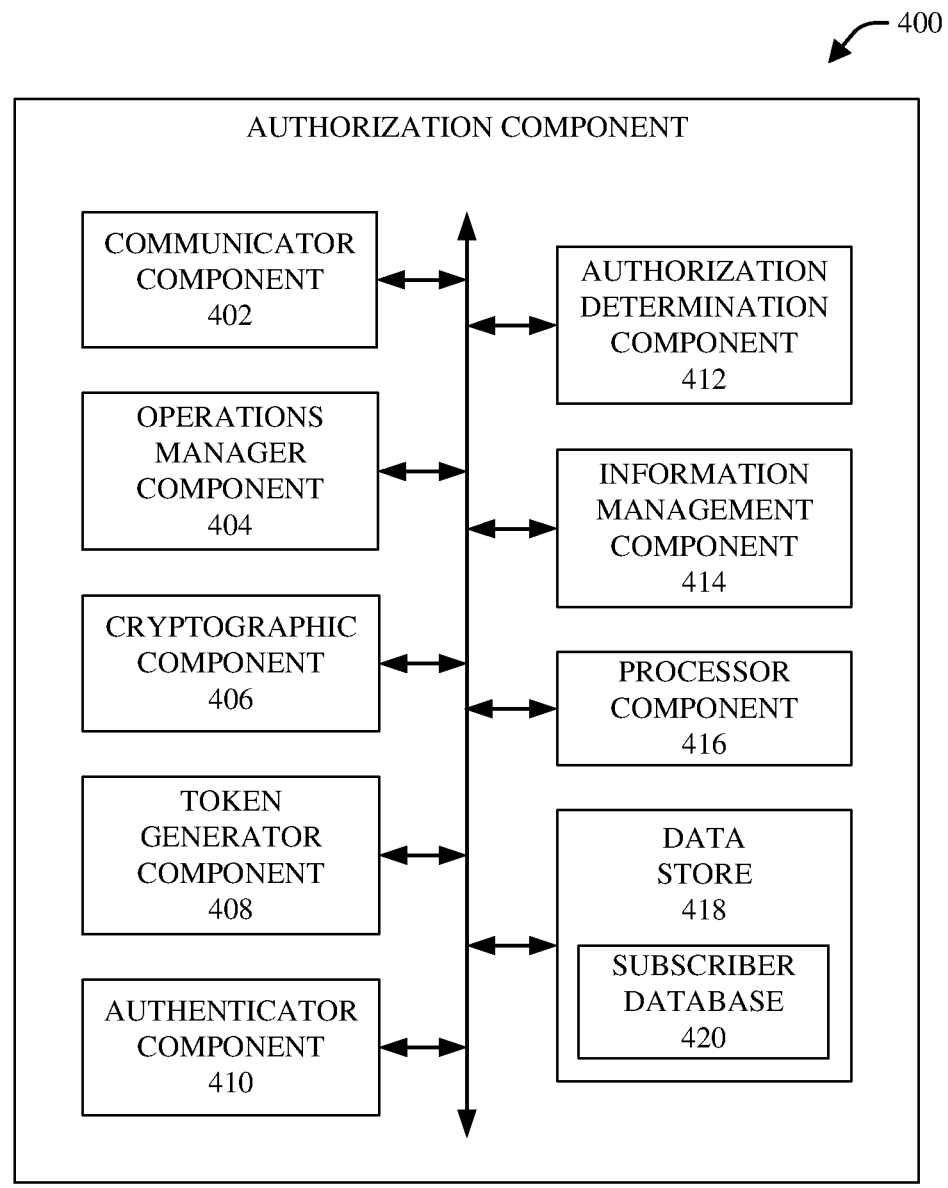
FIG. 4 illustrates a block diagram of an example authorization component, in accordance with various aspects and embodiments of the disclosed subject matter.

Turning to FIG. 4, FIG. 4 illustrates a block diagram of an example authorization component 400, in accordance with various aspects and embodiments of the disclosed subject matter. The authorization component 400 can comprise a communicator component 402, operations manager component 404, cryptographic component 406, token generator component 408, authenticator component 410, authorization determination component 412, information management component 414, processor component 416, and data store 418, wherein the data store 418 can store a subscriber database 420.

The communicator component 402 can communicate (e.g., transmit and receive) information, including information relating to managing authorization and authentication of tokens, communication devices, and/or users in connection with managing access to application components (e.g., application or configuration servers) and associated services by communication devices and/or associated users. For instance, the communicator component 402 can receive service request messages, authentication request messages, and/or device identifier information from communication devices, and/or can receive token validation request messages from application components. The communicator component 402 also can transmit encrypted tokens or packets to communication devices, validation-related or authorization-related information, subscriber-related information, not-validated or not-authorized information, and/or other desired information to application components.

The operations manager component 404 can control (e.g., manage) operations associated with the authorization component 400. For example, the operations manager component 404 can facilitate generating instructions to have components of the authorization component 400 perform operations, and can communicate respective instructions to respective components (e.g., communicator component 402, cryptographic component 406, token generator component 408, . . . , processor component 416, and/or data store 418) of the authorization component 400 to facilitate performance of operations by the respective components of the authorization component 400 based at least in part on the instructions, in accordance with the defined security management criteria and security management algorithms (e.g., service access management algorithms, authorization or validation algorithms, cryptographic algorithms, information management algorithms, etc., as disclosed, defined, recited, or indicated herein by the methods, systems, and techniques described herein). The operations manager component 404 also can facilitate controlling data flow between the respective components of the authorization component 400 and controlling data flow between the authorization component 400 and another component(s) or device(s) (e.g., application component, communication devices, network devices of the communication network, data sources, services, or applications, . . . ) associated with (e.g., connected to) the authorization component 400.

The cryptographic component 406 can perform cryptographic operations on data (e.g., device identifier information, user or subscriber-related information, tokens or data packets, . . . ) to encrypt or decrypt the data. For instance, the cryptographic component 406 can encrypt data, including device identifier information, to generate an encrypted token or packet, based at least in part on a desired encryption key, a desired initialization vector, and a desired encryption algorithm, in accordance with the defined security management criteria, in connection with a communication device attempting to gain access to and use a service. The cryptographic component 406 also can encrypt validation-related information, including a permitted portion of subscriber-related information, to facilitate secure communication of such information to an application component, in connection with a communication device attempting to gain access to and use a service. The cryptographic component 406 also can decrypt an encrypted token or packet, based at least in part on a desired private decryption key, desired initialization vector, and desired decryption algorithm, in accordance with the defined security management criteria, in connection with a communication device attempting to gain access to and use a service.

The token generator component 408 can generate tokens or data packets, comprising desired information (e.g., device identifier information or other desired information) that can be utilized to facilitate securing access to services and managing authorization to access and use services. For instance, in connection with a communication device attempting to gain access to and use a service, the token generator component 408 can generate a token, comprising device identifier information, wherein the cryptographic component 406 can encrypt the token, including the information therein, to generate an encrypted token, as more fully described herein.

The authenticator component 410 can perform authentication operations to authenticate communication devices and users. For example, in response to the authorization component 400 receiving an encrypted token from a communication device, and decryption of the encrypted token by the cryptographic component 406, the authenticator component 410 can perform authentication operations with regard to the decryption of the encrypted token and/or the decrypted information obtained from the token to facilitate determining whether the encrypted token is valid (e.g., is authenticated) and the communication device and/or associated user are authenticated. If, based at least in part on the results of analyzing the decryption of the encrypted token and/or the decrypted information obtained from the token, the authenticator component 410 determines that the encrypted token was successfully decrypted and the decrypted information (e.g., device identifier information) is proper (e.g., the device identifier information matches with the communication device and/or stored device identifier information associated with the communication device), the authenticator component 410 can determine that the encrypted token is validated and/or the communication device and/or user are authenticated. If, instead, based at least in part on the results of analyzing the decryption of the encrypted token and/or the decrypted information obtained from the token, the authenticator component 410 determines that the encrypted token was not successfully decrypted and/or the decrypted information (e.g., device identifier information) is not proper (e.g., the device identifier information does not match with the communication device and/or stored device identifier information associated with the communication device), the authenticator component 410 can determine that the encrypted token is not validated and/or the communication device and/or user are not authenticated.

The authorization determination component 412 can determine whether a communication device and/or associated user are authorized to access a service requested by the communication device and/or user. The authorization determination component 412 can analyze the authentication results associated with an encrypted token (e.g., decryption of the encrypted token) and the associated communication device (e.g., device that submitted the encrypted token) and/or user, and subscriber-related information associated with the communication device and/or user. If, based at least in part on the results of such analysis, the authorization determination component 412 determines that the communication device and/or user are authenticated, and determines that the subscription or account status of the communication device and/or user with regard to the service is active and otherwise valid, the authorization determination component 412 can determine that the communication device and/or user are authorized to access and use the requested service. If, instead, based at least in part on the results of such analysis, the authorization determination component 412 determines that the communication device and/or user are not authenticated, and/or determines that the subscription or account status of the communication device and/or user with regard to the service is not active (e.g., inactive, terminated, suspended, or non-existent status) or is otherwise not valid, the authorization determination component 412 can determine that the communication device and/or user are not authorized to access and use the requested service.

The information management component 414 can manage and secure information, including subscriber-related information associated with communication devices and/or users, to allow entities (e.g., application components) to have access to certain information that such entities are permitted to access, and prevent unauthorized exposure or provision of all or a portion of the information to entities (e.g., unauthorized entities) that are not authorized to access all or the portion of the information. For example, in connection with a communication device attempting to gain access to and use a service via an application component, the information management component 414 can analyze subscriber-related information associated with the communication device and a defined trust level associated with the application component. Based at least in part on the results of analyzing the subscriber-related information and the defined trust level, the information management component 414 can determine a permitted portion of the subscriber-related information that the application component is permitted to access or receive, in accordance with the defined trust level.

The processor component 416 can work in conjunction with the other components (e.g., communicator component 402, cryptographic component 406, token generator component 408, . . . , and/or data store 418) to facilitate performing the various functions of the authorization component 400. The processor component 416 can employ one or more processors, microprocessors, or controllers that can process data, such as information relating to communication devices, users, subscriber-related information, application components, defined trust levels associated with application components, services, tokens, data encryption, data decryption, metadata, parameters, threshold levels, traffic flows, policies, defined security management criteria, security management algorithms (e.g., service access management algorithms, authorization or validation algorithms, cryptographic algorithms, information management algorithms, etc.), protocols, interfaces, tools, and/or other information, to facilitate operation of the authorization component 400, as more fully disclosed herein, and control data flow between the authorization component 400 and other components (e.g., application components, communication devices, a base station or other network component or device of the communication network, data sources, services, or applications, . . . ) associated with the authorization component 400.

The data store 418 can store data structures (e.g., user data, metadata), code structure(s) (e.g., modules, objects, hashes, classes, procedures) or instructions, information relating to communication devices, users, subscriber-related information, application components, defined trust levels associated with application components, services, tokens, data encryption, data decryption, metadata, parameters, threshold levels, traffic flows, policies, defined security management criteria, security management algorithms (e.g., service access management algorithms, authorization or validation algorithms, cryptographic algorithms, information management algorithms, etc.), protocols, interfaces, tools, and/or other information, to facilitate controlling operations associated with the authorization component 400. In some embodiments, a subscriber database 420 can be stored in the data store, wherein the subscriber database 420 can comprise respective subscriber-related information (e.g., subscriber or device identification information, subscription or account status information, or service plan information, . . . ) relating to respective communication devices and/or respective subscribers. In an aspect, the processor component 416 can be functionally coupled (e.g., through a memory bus) to the data store 418 in order to store and retrieve information desired to operate and/or confer functionality, at least in part, to the communicator component 402, cryptographic component 406, token generator component 408, authenticator component 410, authorization determination component 412, information management component 414, and/or data store 418, etc., and/or substantially any other operational aspects of the authorization component 400.

Figure 5:
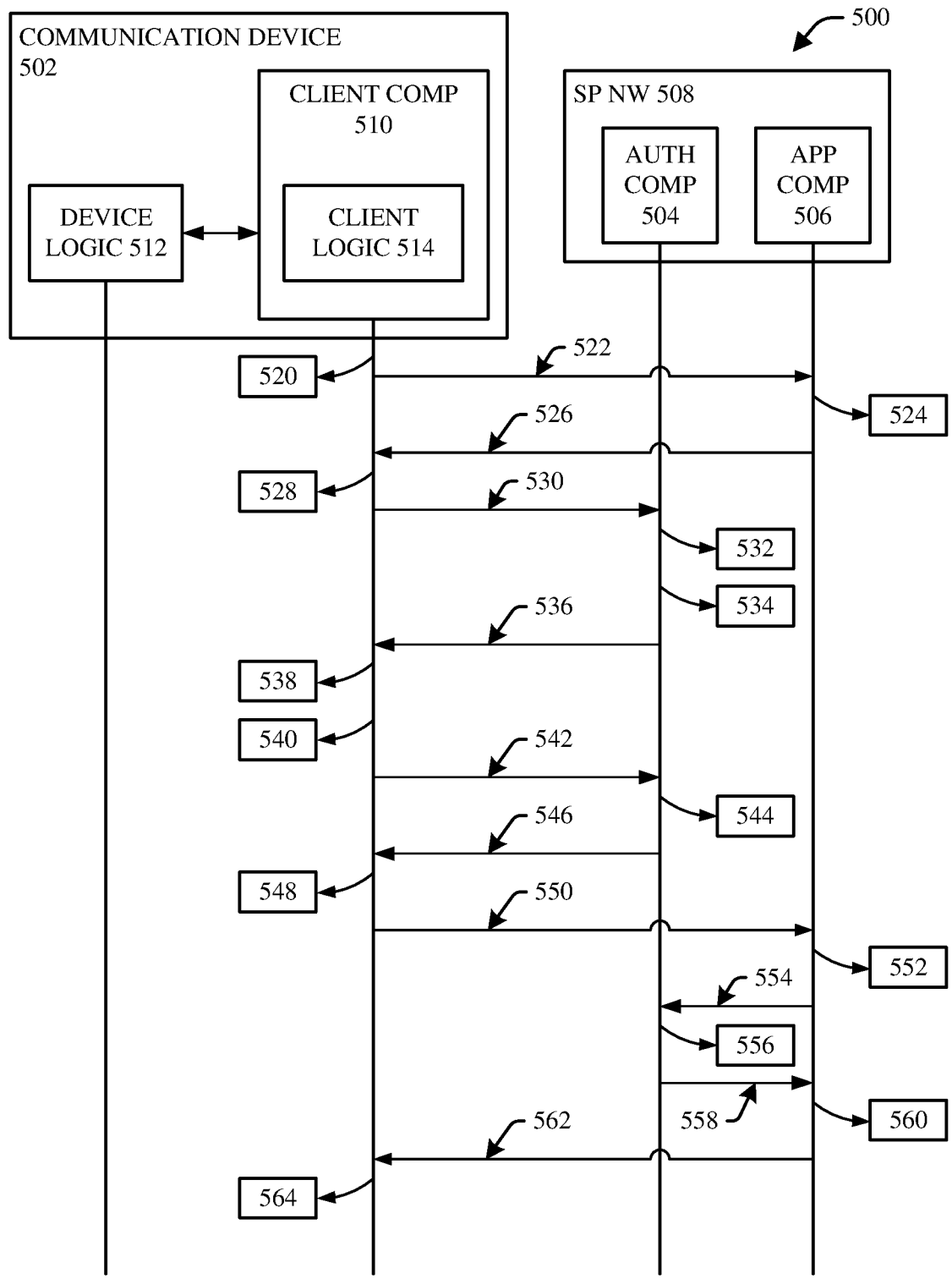
FIG. 5 illustrates a diagram of another example authorization flow that can desirably control authorization and authentication for access to a service and associated application component by a communication device and/or an associated user, in accordance with various aspects and embodiments of the disclosed subject matter.

Referring to FIG. 5, FIG. 5 illustrates a diagram of another example authorization flow 500 that can desirably control authorization and authentication for access to a service and associated application component by a communication device and/or an associated user, in accordance with various aspects and embodiments of the disclosed subject matter. The authorization flow 500 can involve a communication device 502, authorization component (AUTH COMP) 504 (e.g., authorization server), and application component (APP COMP) 506 (e.g., application or configuration server), wherein the authorization component 504 and application component 506 can be part of or associated with an SP network (SP NW) 508. In some embodiments, the authorization component 504 can be an OIDC server, which can be an authorization or OIDC endpoint, in connection with the authorization flow 500.

The communication device 502 can include a client component (CLIENT COMP) 510 (e.g., client) that can be utilized in connection with requesting and using a desired service. The communication device 502 can comprise device logic 512 that the communication device 502 can apply or execute to facilitate requesting and using the desired service, and the client component 510 can comprise client logic 514 that the client component 510 can apply or execute to facilitate requesting and using the desired service, as more fully described herein. For instance, the device logic 512 can work in conjunction with the client logic 514 to facilitate requesting and using the desired service. The respective devices and components (e.g., communication device 502, authorization component 504, application component 506) associated with the authorization flow 500 can be the same as or similar to, and/or can comprise the same or similar functionality as, respective components (e.g., respectively named components), such as more fully described herein.

As indicated at reference numeral 520 of the authorization flow 500, in connection with requesting to use a desired service, the client logic 514 can generate or issue a client configuration request that can indicate support of hypertext transfer protocol (HTTP) embedded EAP-AKA. At reference numeral 522, the client logic 514 can send (e.g., transmit) the client configuration request (e.g., first client configuration request) to the application component 506, in connection with requesting configuration of the client component 510 and requesting the use of the desired service. The client component 510, which can support authentication via HTTP embedded EAP-AKA, can, using (e.g., applying) the client logic 514, send the client configuration request to the application component 506 using a secured communication connection (e.g., secured HTTP connection) and can add an EAP identification (EAP_ID) parameter to the client configuration request, in accordance with the standards and procedures of a defined communication service protocol, which can be part of the defined security management criteria. In some embodiments, the defined communication service protocol can be or can comprise a protocol (e.g., RCS or RCS-related protocol) that can be used for services, such as rich communication services. The EAP_ID parameter can indicate that the client component 510 can support the procedures for HTTP embedded EAP-AKA. The value of the EAP_ID parameter can contain the authentication identity for EAP-AKA.

As presented at reference numeral 524 of the authorization flow 500, in response to receiving the client configuration request, the application component 506 can detect an unauthenticated access by the communication device 502 (e.g., the client component 510 of the communication device 502) and can initiate an authentication request to the authorization component 504 to facilitate redirecting the communication device 502 to the authorization component 504 for authentication. In some embodiments, in response to receiving the client configuration request, the application component 506 can initially validate the client component 510 and terminal parameters, and, as part of this validation (e.g., verification), the application component 506 can challenge the client component 510 to provide proof (e.g., authentication information or credential) of authenticity of the client component 510 and to confirm that the client component 510 is operating (e g, running) on a trustworthy platform as defined for the client configuration request, in accordance with the standards and procedures of the defined communication service protocol. If proof of client authenticity is desired (e.g., wanted or required), the application component 506 can invoke a desired client authenticity verification procedure, in accordance with the standards and procedures of the defined communication service protocol.

Based at least in part on the request parameter (e.g., the EAP_ID parameter), the application component 506 can detect the support of HTTP embedded EAP-AKA. To authenticate or facilitate authenticating the client component 510 via HTTP embedded EAP-AKA, the application component 506 can invoke a desired authentication code flow, such as, for example, an OIDC authentication code flow, via a response message, such as, for example, a 302 Found response, that can include a desired HTTP location header, including a uniform resource identifier (URI) and/or parameter value, to facilitate redirecting the communication device 502 to the authorization component 504, in accordance with the standards and procedures of the defined communication service protocol. For instance, the desired HTTP location header can comprise a desired location header value that the client can utilize to connect to the authorization component 504. The URI can contain or employ an HTTP secure (HTTPS) scheme to facilitate enforcing a secure connection to the authorization component 504 by the communication device 502.

As indicated at reference numeral 526 of the authorization flow 500, the application component 506 can communicate the response message (e.g., the 302 Found response), comprising the location header, to the client component 510 of the communication device 502. At reference numeral 528, in response to receiving the response message, the client component 510 can invoke the request redirection using the location header information, including the location header value. At reference numeral 530, the client component 510, employing the client logic 514, can use the location header value and URI to facilitate redirecting the communication device 502 to the authorization component 504, and can issue (e.g., generate and send) a get message (e.g., HTTP GET message) to the authorization component 504. If, for some reason, the response message does not include a URI that contains the HTTPS scheme, the client component 510 can abort the processing of the configuration request, including the redirection request, in accordance with the standards and procedures of the defined communication service protocol. For instance, the client component 510 can treat the lack of URI having an HTTPS scheme the same as if there is no application component 506 deployed in the SP network 508.

As indicated at reference numeral 532 of the authorization flow 500 (e.g., where the response message did include the URI that contains the HTTPS scheme and the configuration request is proceeding by the communication device 502 sending the get message), the authorization component 504 can receive and process the get message. At reference numeral 534, the authorization component 504 can invoke the EAP-AKA procedure (e.g., can invoke authentication via HTTP embedded EAP-AKA with respect to the client component 510 of the communication device 502), can generate an EAP-AKA packet (e.g., EAP relay packet), and can initiate sending the EAP-AKA packet to the client component 510, in accordance with the standards and procedures of the defined communication service protocol. At reference numeral 536, the authorization component 504 can communicate a response message (e.g., 200 OK message), comprising the EAP-AKA packet, to the client component 510 of the communication device 502.

As represented at reference numeral 538 of the authorization flow 500, the client component 510 can receive the response message, including the EAP-AKA packet, and can invoke the EAP-AKA procedure using the EAP-AKA packet. For instance, the client component 510, employing the client logic 514, can apply the EAP-AKA procedure to process the EAP-AKA packet, and produce a result (e.g., EAP-AKA result), in accordance with the standards and procedures of the defined communication service protocol. As indicated at reference numerals 540 and 542 of the authorization flow 500, the client component 510, employing the client logic 514, can send a message (e.g., POST message), comprising the result of the EAP-AKA processing, to the authorization component 504.

As indicated at reference numerals 544 and 546 of the authorization flow 500, in response to receiving the message, including the result of the EAP-AKA processing, from the communication device 502, the authorization component 504 can validate (e.g., verify) the EAP-AKA response (e.g., the result), and, if such response is validated (e.g., if authentication via HTTP embedded EAP-AKA is successful and completed), the authorization component 504 can create an authentication token (e.g., encrypted authentication token, which also can be referred to as an access token), and communicate a response message (e.g., a 302 Found response message), comprising the authentication token and location header, to the client component 510, in accordance with the standards and procedures of the defined communication service protocol. The response message can comprise a desired location header that can include the authentication response for the processing in the application component 506, for example, via the authentication response (e.g., OIDC authentication response). The URI in the location header can contain the HTTPS scheme to facilitate enforcing a secure connection to the application component 506 by the communication device 502.

As represented at reference numeral 548 of the authorization flow 500, in response to receiving the response message, including the location header, location header value, and authentication token, the client component 510, employing the client logic 514, can resume the configuration request for the desired service using the encrypted authentication token. If, for some reason, the response message does not include a URI that contains the desired HTTPS scheme, the client component 510 can abort the processing of the configuration request, in accordance with the standards and procedures of the defined communication service protocol. For example, the client component 510 can treat the lack of URI having the desired HTTPS scheme the same as if there is no application component 506 deployed in the SP network 508.

In connection with proceeding with the configuration request (e.g., if the response message included the desired location header, location header value, and URI that contains the HTTPS scheme), as indicated at reference numeral 550, the client component 510, employing the client logic 514, can communicate a get message (e.g., HTTP GET message), comprising the encrypted authentication token and the desired location header, and using the desired location header value and desired URI, to the application component 506.

As indicated at reference numeral 552 of the authorization flow 500, in response to receiving the get message (e.g., communication device request message), comprising the encrypted authentication token, the application component 506 can parse the get message and retrieve the encrypted authentication token (e.g., EAP-AKA token) from the get message, and can initiate sending of the encrypted authentication token to the authorization component 504 for validation. For instance, as represented at reference numeral 554, the application component 506 can communicate (e.g., as a backend query) a token validation request message, comprising the encrypted authentication token, to the authorization component 504 for validation (e.g., verification) of the token by the authorization component 504.

As represented at reference numeral 556, in response to receiving the token validation request message, including the encrypted authentication token, the authorization component 504 can perform (e.g., in real time or substantially real time) a validation procedure on the encrypted authentication token, and, if the token is validated, the authorization component 504 can determine (e.g., in real time or substantially real time) the subscriber or account status of the communication device 502 and/or associated user based at least in part on the results of analyzing subscriber-related information associated with the communication device 502 and/or associated user, in accordance with the defined security management criteria, including the standards and procedures of the defined communication service protocol, as more fully described herein, wherein such subscriber-related information can be obtained from the subscriber database of or associated with the authorization component 504. If the token is validated and the communication device 502 and/or associated user are determined to have an active subscriber or account status with regard to the requested service, the authorization component 504 also can determine a permitted portion (if any) of the subscriber-related information (e.g., IMSI, MSISDN, other device identifier, account status information, subscriber billing address or account, and/or information regarding type of service plan, . . . ) that the application component 506 is permitted (e.g., authorized) to have, based at least in part on the defined trust level associated with the application component 506 and the results of analyzing the subscriber-related information, as more fully described herein.

If the authorization component 504 determines that the token is valid, and determines that the communication device 502 and/or associated user have an active subscriber or account status with regard to the requested service, the authorization component 504 can generate a response message (e.g., validated, authorized, or success response message) that can indicate that the communication device 502 and/or associated user are authorized to access and use the requested service, wherein such response message can include the permitted portion (if any) of subscriber-related information associated with the communication device 502 and/or associated user, as more fully described herein. If, instead, the authorization component 504 determines that the token is not valid, or determines that the communication device 502 and/or associated user do not have an active subscriber or account status with regard to the requested service, the authorization component 504 can generate a response message (e.g., not-validated, not-authorized, or failure response message) that can indicate that the communication device 502 and/or associated user are not authorized to access and use the requested service, as more fully described herein.

As indicated at reference numeral 558 of the authorization flow 500, the authorization component 504 can communicate the response message (e.g., 200 OK response message) to the application component 506, wherein the response message can be a success response message (e.g., validated or authorized response message) or can be a failure response message (e.g., not-validated or not-authorized response message), depending on the results of validation of the token and the determination of the subscriber or account status by the authorization component 504. In some embodiments, the authorization component 504 can encrypt the information (e.g., validation-related, authorization-related, or active-status information, including the permitted portion of the subscriber-related information; or not-validated, not-authorized, or not-active-status information) in the response message using a desired encryption algorithm and can communicate the response message, via a secure communication channel, to the application component 506.

As represented at reference numeral 560 of the authorization flow 500, in response to receiving the response message from the authorization component 504, the application component 506 can analyze the response message to determine whether the subscriber or account status indicates that the communication device 502 and/or associated user are authorized to access and use the requested service, and, if authorized, the application component 506 can create a client configuration response message that can comprise configuration-related information to facilitate configuration of the client component 510 to enable the client component 510 to access and utilize the requested service. For instance, the application component 506 can analyze the information (e.g., validation-related, authorization-related, or active-status information; or not-validated, not-authorized, or not-active-status information) in the response message to determine whether the communication device 502 and/or user are validated and authorized to use the requested service. If the information (e.g., not-validated, not-authorized, or not-active-status information) indicates that the communication device 502 and/or user are not authorized to use the requested service, the application component 506 can determine that the communication device 502 and/or user are to be denied access and use of the requested service, and can prevent the communication device 502 from accessing and using the requested service. If the information (e.g., validation-related, authorization-related, or active-status information) indicates that the communication device 502 and/or user are authorized to use the requested service, the application component 506 can determine that the communication device 502 and/or user can be granted access to and use of the requested service, and can allow the communication device 502 and/or user to access and use the requested service.

With regard to authorized access to the requested service, the application component 506 can generate configuration-related information that can comprise, for example, configuration information, configuration control information, and/or a token value (e.g., a token parameter in the token characteristic). In some embodiments, the application component 506 can format the configuration-related information, using a desired format (e.g., XML format), to generate formatted configuration-related information). For example, the application component 506 can generate a configuration XML document that can comprise the configuration information, configuration control information, and/or token value, in the XML format.

As indicated at reference numeral 562 of the authorization flow 500, the application component 506 can communicate a response message (e.g., a 200 OK message) to the client component 510 of the communication device 502. If the communication device 502 and/or user are determined to be authorized to use the requested service, such response message can comprise the configuration-related information (e.g., configuration XML document comprising the configuration-related information). If, instead, the application component 506 determined that the communication device 502 and/or user are not authorized to use the requested service, the response message can indicate that the service request is denied, and there will be no configuration-related information in such message.

As indicated at reference numeral 564 of the authorization flow 500, in response to receiving a response message, comprising the configuration-related information, the client component 510, employing the client logic 514, can apply the configuration-related information (e.g., apply the configuration XML document and/or token value, if included) to facilitate configuring the client component 510 to enable the client component 510 to access and use the requested service via the application component 506. If the configuration-related information includes a token value (e.g., token parameter in the token characteristic), the client component 510 can apply the processing of the token, in accordance with the standards and procedures of the defined communication service protocol. With the client component 510 configured, the communication device 502 and/or user can access and utilize the requested service (e.g., in accordance with the service plan).

Figure 6:
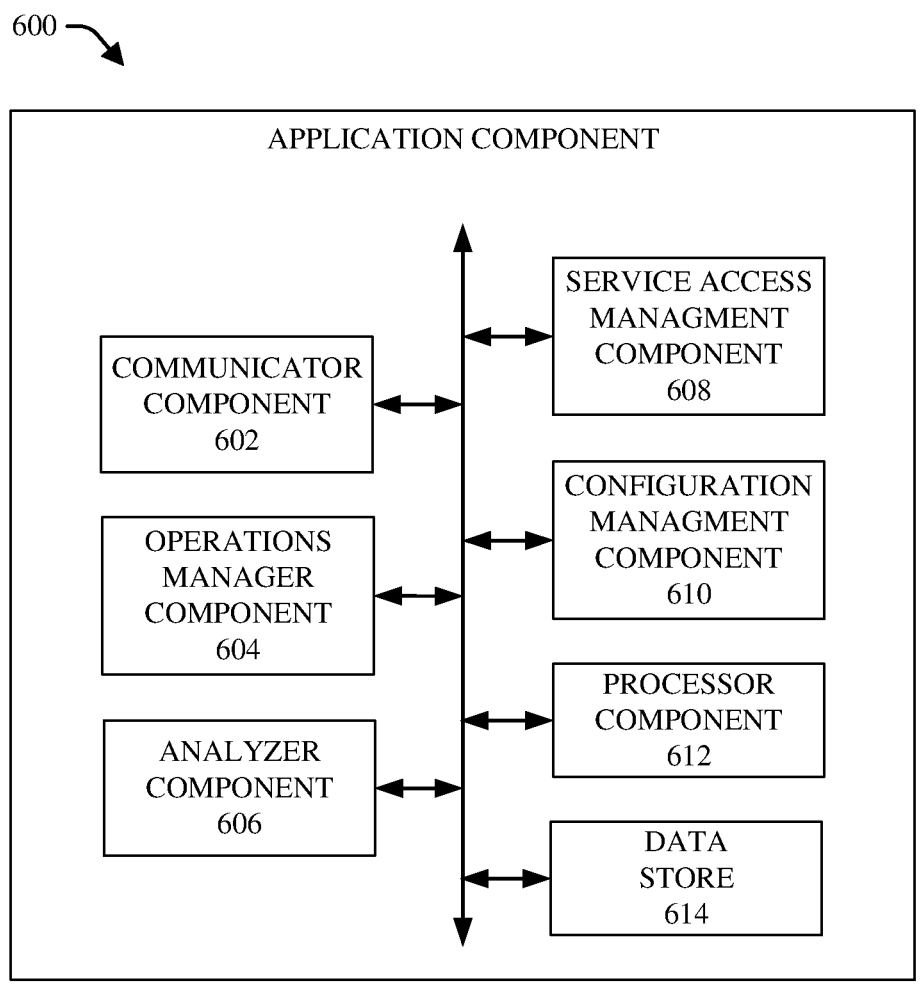
FIG. 6 depicts a block diagram of example application component, in accordance with various aspects and embodiments of the disclosed subject matter.

FIG. 6 depicts a block diagram of the example application component 600 (e.g., application or configuration server), in accordance with various aspects and embodiments of the disclosed subject matter. The application component 600 can comprise a communicator component 602, an operations manager component 604, an analyzer component 606, a service access management component 608, a configuration management component 610, a processor component 612, and a data store 614.

The communicator component 602 can communicate (e.g., transmit and receive) information, including information relating to requests for access to services by communication devices and/or associated users. For instance, the communicator component 602 can receive service request messages from communication devices, and/or can receive encrypted tokens or packets from communication devices in connection with requests to access services. The communicator component 602 also can receive validation-related or authorization-related information, subscriber-related information, or not-validated or not-authorized information from the authorization component, in connection with requests for access to services by communication devices and/or users. The communicator component 602 also can transmit validation requests (e.g., token validation requests) and encrypted tokens or packets to the authorization component to facilitate determining whether communication devices and/or associated users are validated and authorized to access requested services, in connection with requests for access to services by communication devices and/or users.

The operations manager component 604 can control (e.g., manage) operations associated with the application component 600. For example, the operations manager component 604 can facilitate generating instructions to have components of the application component 600 perform operations, and can communicate respective instructions to respective components (e.g., communicator component 602, analyzer component 606, service access management component 608, configuration management component 610, processor component 612, and data store 614) of the application component 600 to facilitate performance of operations by the respective components of the application component 600 based at least in part on the instructions, in accordance with the defined service access management criteria and service access management algorithms, as disclosed, defined, recited, or indicated herein by the methods, systems, and techniques described herein). The operations manager component 604 also can facilitate controlling data flow between the respective components of the application component 600 and controlling data flow between the application component 600 and another component(s) or device(s) (e.g., authorization component, communication devices, network devices of the communication network, data sources, services, or applications, . . . ) associated with (e.g., connected to) the application component 600.

The analyzer component 606 can analyze or parse information to facilitate performing operations and making determinations relating to managing access to services associated with the application component 600. For instance, the analyzer component 606 can parse a service request message, comprising an encrypted token, to identify and retrieve the encrypted token from the service request message. The analyzer component 606 also can analyze validation-related or authorization-related information, subscriber-related information, or not-validated or not-authorized information associated with a communication device and/or associated user, as received (e.g., whichever is received) from the authorization component, to facilitate determining whether the communication device and/or user are authorized to access and utilize a requested service and/or, if authorized, determining what particular services of the service the communication device and/or user are permitted to utilize (e.g., in accordance with a service plan associated with the communication device and/or user).

The service access management component 608 can manage (e.g., control) access to and use of a requested service, by a communication device and/or associated user, based at least in part on the type of validation-related or authorization-related information (e.g., validation-related or authorization-related information, subscriber-related information, or not-validated or not-authorized information) received from the authorization component, in connection with a service request for access to and use of the service by the communication device and/or user. For example, in response to receiving, and based at least in part on an analysis (e.g., by the analyzer component 606 and/or service access management component 608) of, validation-related information, including a permitted portion of subscriber-related information (e.g., in accordance with the defined trust level associated with the application component 600), that indicates a communication device and/or associated user are authorized to access a requested service, the service access management component 608 can allow the communication device and/or user to access and utilize the service (or a subset of services of the service), in accordance with the validation-related information and/or subscriber-related information (e.g., in accordance with the service plan associated with the communication device and/or user). As another example, in response to receiving, and based at least in part on an analysis (e.g., by the analyzer component 606 and/or service access management component 608) of, not-validated or not-authorized information that indicates a communication device and/or associated user are not authorized to access a requested service, the service access management component 608 can deny the communication device and/or user access to and utilization of the service, in accordance with the not-validated or not-authorized information.

The configuration management component 610 can generate configuration information and/or configuration control information, and/or can generate a desired token value (e.g., a token parameter in the token characteristic), to facilitate configuration of a communication device (e.g., a client of the communication device) and use of the requested service by the communication device. In some embodiments, the configuration management component 610 can employ a desired format (e.g., XML format) in connection with generating the configuration information, configuration control information, and/or token value to generate formatted configuration information, formatted configuration control information, and/or formatted token value. For instance, the configuration management component 610 can generate a configuration XML document that can comprise configuration information, configuration control information, and/or token value in XML format. In other embodiments, the configuration management component 610 can utilize another type of document or information format to facilitate generating the formatted configuration information, formatted configuration control information, and/or formatted token value.

The processor component 612 can work in conjunction with the other components (e.g., communicator component 602, operations manager component 604, analyzer component 606, service access management component 608, configuration management component 610, and/or data store 614) to facilitate performing the various functions of the application component 600. The processor component 612 can employ one or more processors, microprocessors, or controllers that can process data, such as information relating to communication devices, users, subscriber-related information, authorization component, services, tokens, data encryption, data decryption, configuration-related information, metadata, parameters, threshold levels, traffic flows, policies, defined service access management criteria, service access management algorithms, protocols, interfaces, tools, and/or other information, to facilitate operation of the application component 600, as more fully disclosed herein, and control data flow between the application component 600 and other components (e.g., authorization component, communication devices, network devices of the communication network, data sources, services, or applications, . . . ) associated with the application component 600.

The data store 614 can store data structures (e.g., user data, metadata), code structure(s) (e.g., modules, objects, hashes, classes, procedures) or instructions, information relating to communication devices, users, subscriber-related information, authorization component, services, tokens, data encryption, data decryption, configuration-related information, metadata, parameters, threshold levels, traffic flows, policies, defined service access management criteria, service access management algorithms, protocols, interfaces, tools, and/or other information, to facilitate controlling operations associated with the application component 600. In an aspect, the processor component 612 can be functionally coupled (e.g., through a memory bus) to the data store 614 in order to store and retrieve information desired to operate and/or confer functionality, at least in part, to the communicator component 602, operations manager component 604, analyzer component 606, service access management component 608, configuration management component 610, and/or data store 614, etc., and/or substantially any other operational aspects of the application component 600.

Described herein are systems, methods, articles of manufacture, and other embodiments or implementations that can facilitate estimating locations of cells and validating cell locations (e.g., estimated cell locations and/or recorded cell locations from data sources) of cells of a communication network, as more fully described herein. The estimating locations of cells and validating cell locations of cells of a communication network, and/or other features of the disclosed subject matter, can be implemented in connection with any type of device with a connection to, or attempting to connect to, the communication network (e.g., a wireless or mobile device, a computer, a handheld device, etc.), any IoT device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 7:
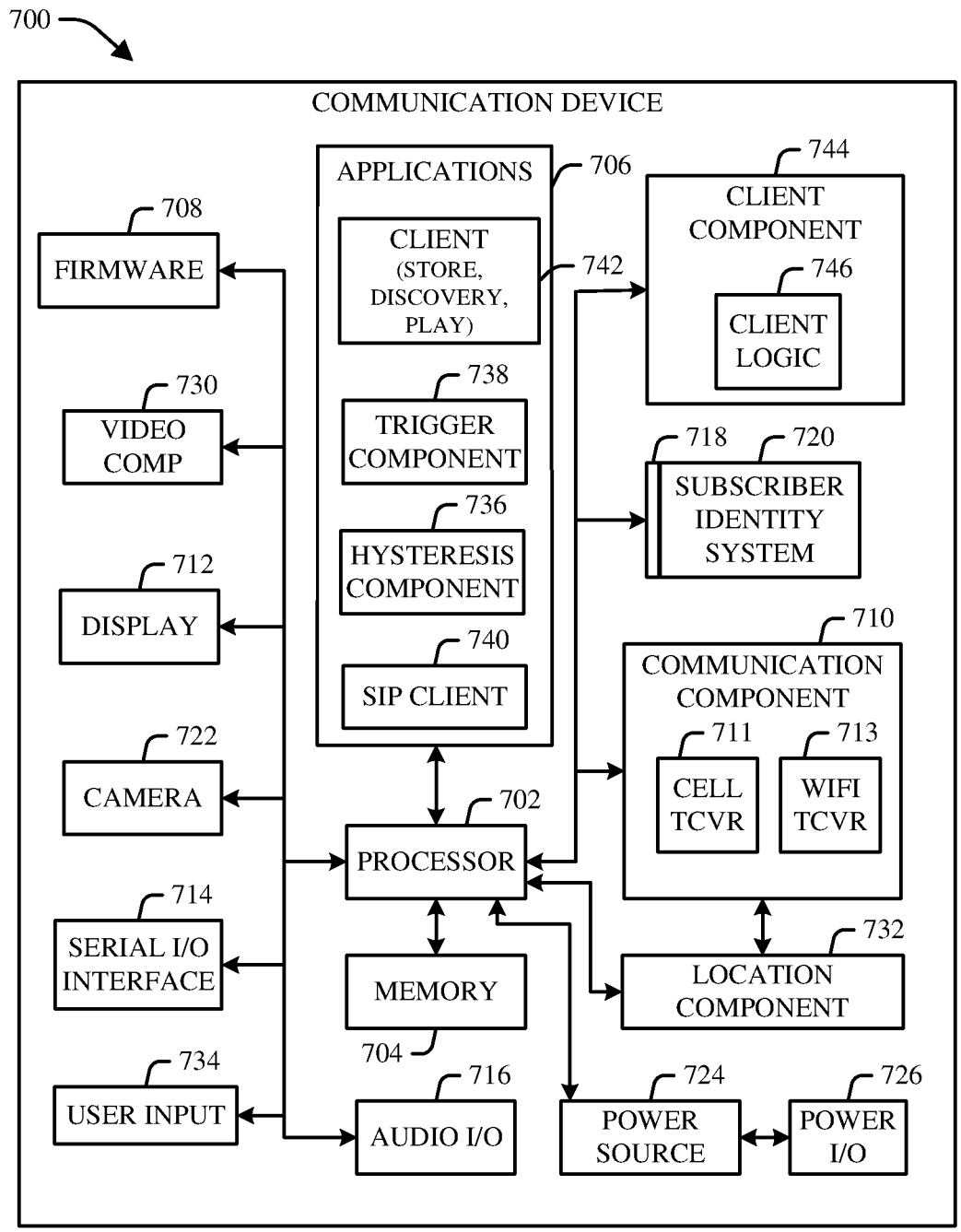
FIG. 7 depicts a block diagram of an example communication device operable to engage in a system architecture that facilitates wireless communications according to one or more embodiments described herein.

Referring now to FIG. 7, depicted is a block diagram of an example communication device 700 (e.g., wireless or mobile phone, electronic pad or tablet, electronic eyewear, electronic watch, or other electronic bodywear, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 700 can include a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708, and executed by the processor 702 from either or both the memory 704 or/and the firmware 708. The firmware 708 can also store startup code for execution in initializing the communication device 700. A communication component 710 interfaces to the processor 702 to facilitate wired/wireless communication with external systems, e.g., cellular networks, VoIP networks, and so on. Here, the communication component 710 can also include a suitable cellular transceiver 711 (e.g., a GSM transceiver) and/or an unlicensed transceiver 713 (e.g., Wi-Fi, WiMax) for corresponding signal communications. The communication device 700 can be a device such as a cellular telephone, a PDA with mobile communications capabilities, and messaging-centric devices. The communication component 710 also facilitates communications reception from terrestrial radio networks (e.g., broadcast), digital satellite radio networks, and Internet-based radio services networks.

The communication device 700 includes a display 712 for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 700, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

The communication device 700 can include a slot interface 718 for accommodating a SIC (Subscriber Identity Component) in the form factor of a card Subscriber Identity Module (SIM) or universal SIM 720, and interfacing the SIM card 720 with the processor 702. However, it is to be appreciated that the SIM card 720 can be manufactured into the communication device 700, and updated by downloading data and software.

The communication device 700 can process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the communication device 700 and IP-based multimedia content can be received in either an encoded or a decoded format.

A video processing component 722 (e.g., a camera) can be provided for decoding encoded multimedia content. The video processing component 722 can aid in facilitating the generation, editing, and sharing of video quotes. The communication device 700 also includes a power source 724 in the form of batteries and/or an AC power subsystem, which power source 724 can interface to an external power system or charging equipment (not shown) by a power I/O component 726.

The communication device 700 can also include a video component 730 for processing video content received and, for recording and transmitting video content. For example, the video component 730 can facilitate the generation, editing and sharing of video quotes. A location tracking component 732 facilitates geographically locating the communication device 700. As described hereinabove, this can occur when the user initiates the feedback signal automatically or manually. A user input component 734 facilitates the user initiating the quality feedback signal. The user input component 734 can also facilitate the generation, editing and sharing of video quotes. The user input component 734 can include such conventional input device technologies such as a keypad, keyboard, mouse, stylus pen, and/or touch screen, for example.

Referring again to the applications 706, a hysteresis component 736 facilitates the analysis and processing of hysteresis data, which is utilized to determine when to associate with the access point. A software trigger component 738 can be provided that facilitates triggering of the hysteresis component 736 when the Wi-Fi transceiver 713 detects the beacon of the access point. A SIP client 740 enables the communication device 700 to support SIP protocols and register the subscriber with the SIP registrar server. The applications 706 can also include a client 742 that provides at least the capability of discovery, play and store of multimedia content, for example, music.

The communication device 700, as indicated above related to the communication component 710, includes an indoor network radio transceiver 713 (e.g., Wi-Fi transceiver). This function supports the indoor radio link, such as IEEE 802.11, for the dual-mode GSM device (e.g., communication device 700). The communication device 700 can accommodate at least satellite radio services through a device (e.g., handset device) that can combine wireless voice and digital radio chipsets into a single device (e.g., single handheld device).

In some embodiments, the communication device 700 can comprise a client component 744 that can comprise and apply client logic 746 to facilitate accessing and utilizing services, as more fully described herein. When authorized to use a service, the client component 744 can receive configuration-related information (e.g., a configuration XML document) from the application component, and the client component 744 can be configured based at least in part on (e.g., in accordance with) the configuration-related information, as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
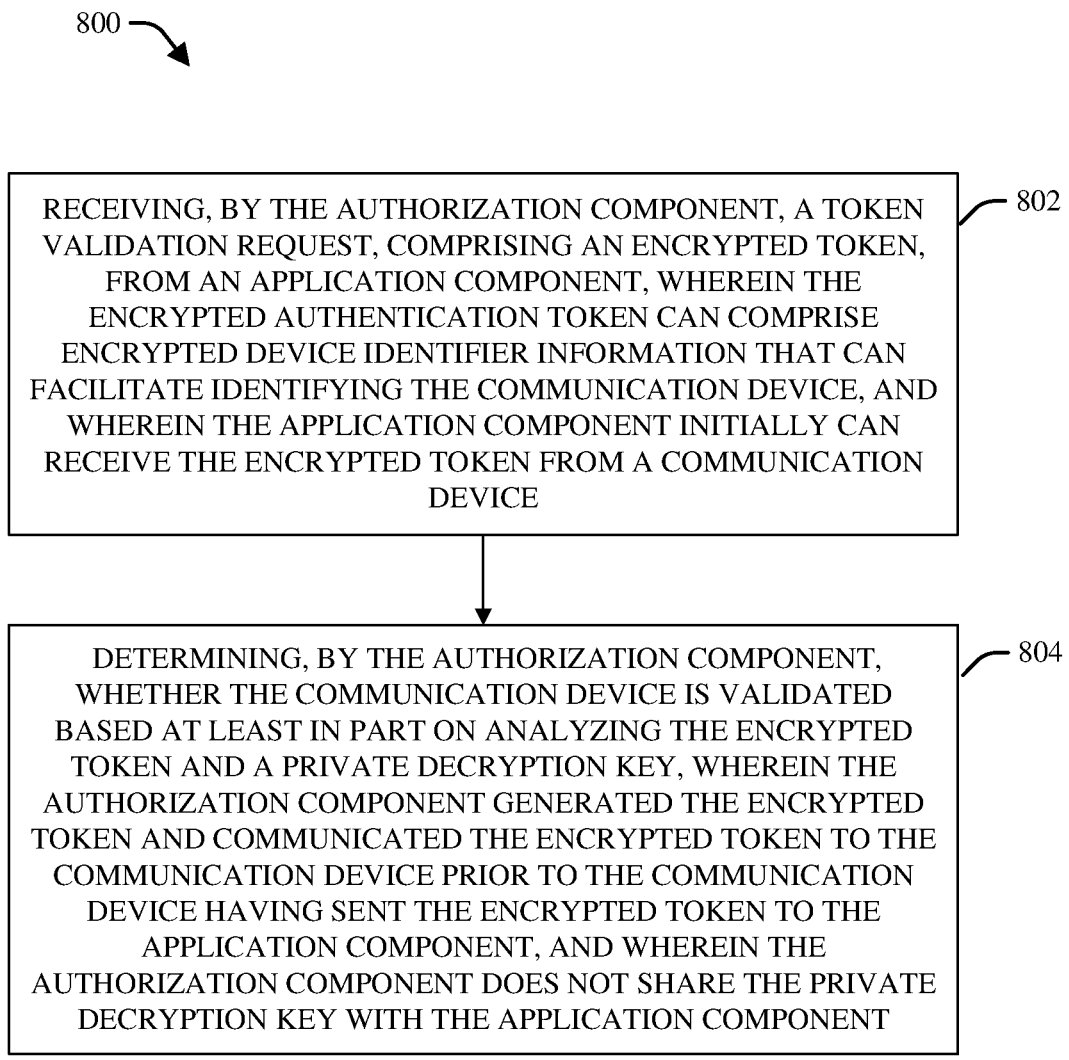
FIG. 8 illustrates a flow chart of an example method that can desirably control authorization and authentication for access to a service and an associated application component (e.g., application or configuration server) and by a communication device and/or an associated user, in accordance with various aspects and embodiments of the disclosed subject matter.
Figure 9:
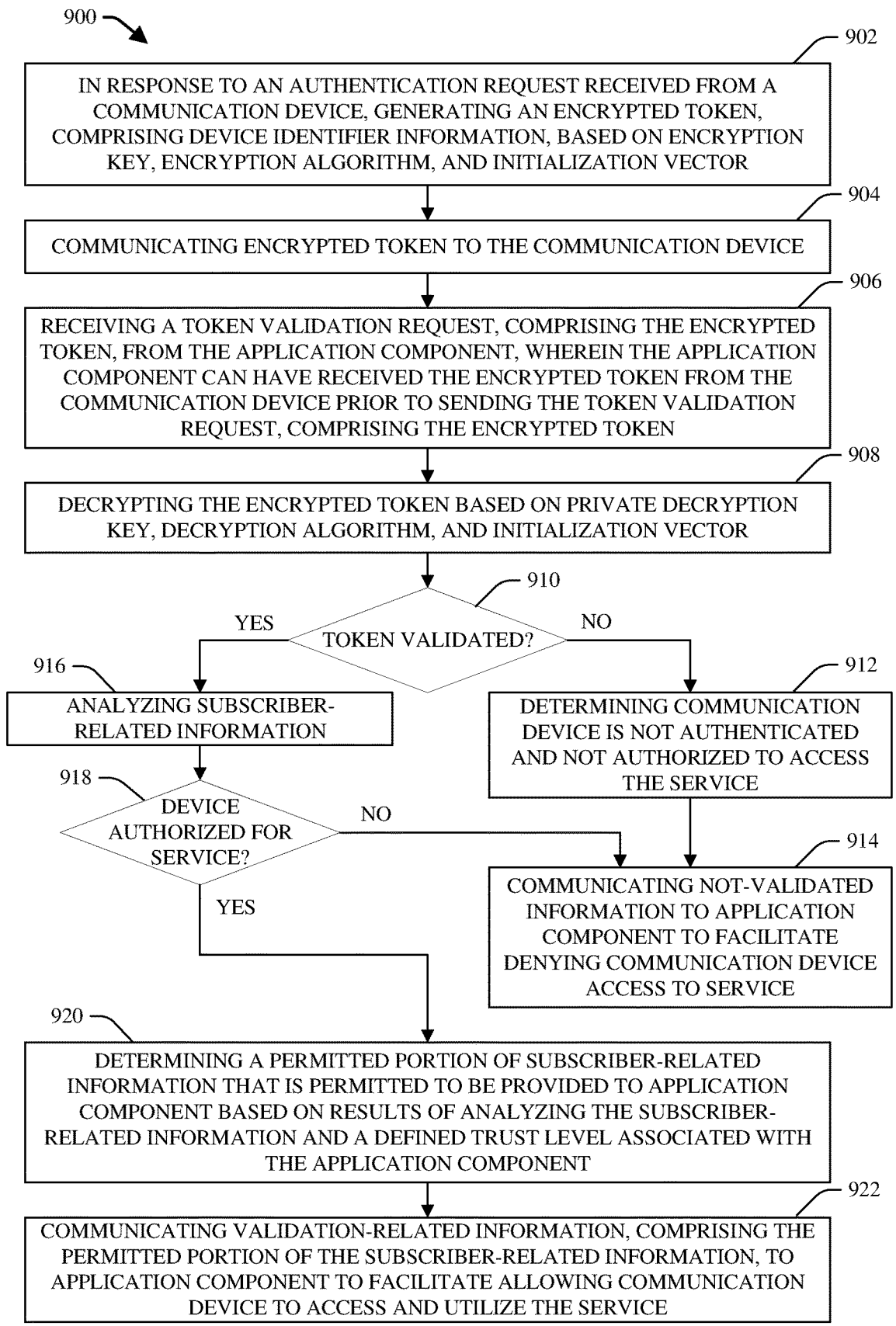
FIG. 9 depicts a flow chart of another example method that can desirably control authorization and authentication for access to a service and an associated application component by a communication device and/or an associated user, in accordance with various aspects and embodiments of the disclosed subject matter.

In view of the example systems and/or devices described herein, example methods that can be implemented in accordance with the disclosed subject matter can be further appreciated with reference to flowcharts in FIGS. 8-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein.

For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can desirably control authorization and authentication for access to a service and an associated application component (e.g., an application or configuration server) by a communication device and/or an associated user, in accordance with various aspects and embodiments of the disclosed subject matter. The method 800 can be employed by, for example, a system that can include the authorization component (e.g., authorization server), a processor component (e.g., of or associated with the authorization component), and/or a data store (e.g., of or associated with the authorization component).

At 802, a token validation request, comprising an encrypted token, can be received by the authorization component from an application component, wherein the encrypted authentication token can comprise encrypted device identifier information that can facilitate identifying the device, and wherein the application component initially can have received the encrypted token from a communication device. At 804, a determination can be made, by the authorization component, whether the communication device is validated based at least in part on analyzing the encrypted token and a private decryption key, wherein the authorization component generated the encrypted token and communicated the encrypted token to the communication device prior to the communication device having sent the encrypted token to the application component, and wherein the authorization component does not share the private decryption key with the application component.

The application component (e.g., application or configuration server) can receive a service request to utilize a service from a communication device, wherein the application component is associated with the service (e.g., rich communication services). The application component can redirect the communication device to the authorization component to have the communication device authenticate with the authorization component. In some embodiments, the authorization component can be part of a first network (e.g., mobility core network) and a second network (e.g., SP network), and the application component can be part of the second network and can be external to the first network. In other embodiments, the application component can be part of the first network as well, instead of being external to the first network.

In response to the communication device contacting the authorization component to facilitate authentication of the communication device with respect to the requested service, the authentication server can generate the encrypted token, which can comprise device identifier information associated with the communication device, based at least in part on an encryption key, a cryptographic algorithm (e.g., encryption algorithm), and an initialization vector. The device identifier information can comprise information that can facilitate identifying the communication device, such as more fully described herein. The authorization component can communicate the encrypted token to the communication device. The communication device can communicate the encrypted token to the application component.

The application component can communicate a token validation request, comprising the encrypted token, to the authorization component. In response to receiving the token validation request, the authorization component can analyze the encrypted token, including decrypting the encrypted token, based at least in part on a private decryption key, a cryptographic algorithm (e.g., decryption algorithm), and the initialization vector, to facilitate validating the encrypted token, and accordingly, the communication device. In some embodiments, the authorization component can prevent the application component and other entities from accessing the private decryption key, cryptographic algorithm, and initialization vector. The authorization component can determine whether token, and accordingly, the communication device, are validated based at least in part on the result of analyzing the encrypted token, the private decryption key, the cryptographic algorithm, and the initialization vector, as more fully described herein. Based at least in part on such determination, and analysis of subscriber-related information relating to the communication device and/or an associated user, the authorization component can determine whether the communication device is authorized to access and utilize the requested service and associated application component, as more fully described herein.

FIG. 9 depicts a flow chart of another example method 900 that can desirably control authorization and authentication for access to a service and an associated application component (e.g., an application or configuration server) by a communication device and/or an associated user, in accordance with various aspects and embodiments of the disclosed subject matter. The method 900 can be employed by, for example, a system that can include the authorization component (e.g., authorization server), a processor component (e.g., of or associated with the authorization component), and/or a data store (e.g., of or associated with the authorization component).

At 902, in response to an authentication request received from a communication device, an encrypted token, comprising device identifier information associated with the communication device, can be generated based at least in part on an encryption key, an encryption algorithm, and an initialization vector. The communication device can send a request to access and utilize a service (e.g., rich communication services) to an application component (e.g., application or configuration server). The application component can redirect the communication device to the authorization component to have the communication device authenticate with the authorization component. In response to the redirection, the communication device can communicate the authentication request to the authorization component to facilitate authentication of the communication device with respect to the requested service.

In response to receiving the authentication request, the authorization component can generate an encrypted token, comprising the device identifier information (e.g., in encrypted form) associated with the communication device, based at least in part on an encryption key, an encryption algorithm, and an initialization vector. For instance, the authorization component can identify the communication device based at least in part on device identifier information detected or received from the communication device and/or as retrieved from a subscriber database in the data store. In some embodiments, the authorization component can compare stored device identifier information associated with a subscription for the service to the device identifier information detected or received from the communication device to determine whether the communication device is associated with the subscription for the service. The authorization component also can authenticate the communication device and/or associated user based at least in part on authentication information (e.g., an authentication credential) received from the communication device. The authorization component can encrypt the device identifier information in the encrypted token.

At 904, the encrypted token can be communicated to the communication device. The authorization component can communicate the encrypted token, comprising the encrypted device identifier information, to the communication device. In some embodiments, in response to authenticating the communication device and/or associated user and/or generating the encrypted token, comprising the encrypted device identifier information, the authorization component can communicate the encrypted token to the communication device.

At 906, a token validation request, comprising the encrypted token, can be received from the application component, wherein the application component can have received the encrypted token from the communication device prior to sending the token validation request, comprising the encrypted token. After the communication device receives the encrypted token from the authorization component, the communication device can send (e.g., communicate) the encrypted token to the application component. The application component can generate the token validation request, comprising the encrypted token, and can send the token validation request to the authorization component. The authorization component can receive the token validation request, comprising the encrypted token, from the application component.

At 908, the encrypted token, including the encrypted device identifier information, can be decrypted based at least in part on a private decryption key, a decryption algorithm, and the initialization vector. The authorization component can decrypt the encrypted token, including the encrypted device identifier information, based at least in part on the private decryption key, decryption algorithm, and initialization vector. For instance, the authorization component can apply or execute the decryption algorithm, and can use the private decryption key and initialization vector, to decrypt the encrypted token to obtain the information, including the device identifier information, in a decrypted form. In some embodiments, the authorization component can prevent the application component from accessing (e.g., the authorization component does not share with the application component) the private decryption key, the decryption algorithm, and the initialization vector.

At 910, a determination can be made regarding whether the token is validated based at least in part on the decryption of the encrypted token. Based at least in part on the decryption of the encrypted token, and the information, including the device identifier information and/or token-related information, obtained from decrypting the token and/or a device identifier of the communication device that provided the encrypted token to the application component, the authorization component can determine whether the token is validated. For instance, the authorization component can analyze such information to determine whether the token is verified to be the same encrypted token the authorization component communicated to the communication device and/or determine whether the device identifier information in the token matches the device identifier of the communication device that provided the encrypted token to the application component.

If the token is not verified and/or if the device identifier information is not verified (e.g., if the device identifier information was compared to the device identifier of the communication device that provided the encrypted token to the application component), the authorization component can determine that the token and associated communication device are not validated. If, instead, the token is verified and/or the device identifier information is verified, the authorization component can determine that the token and the communication device have been authenticated and validated.

In response to determining that the token is not validated, at 912, it can be determined that the communication device is not authenticated and is not authorized to access the service. If the authentication server determines that the token is not validated (e.g., due to the token not being verified and/or the device identifier information not being verified), the authentication server can determine that the communication device is not authenticated and is not authorized to access and utilize the requested service.

At 914, not-validated information can be communicated to the application component to facilitate denying the communication device access to the service. In response to determining that the token and associated communication device are not validated (e.g., the communication device is not authenticated), the authentication server can communicate not-validated information to the application component to indicate that the token and associated communication device were not validated, and to indicate that the communication device is not authorized to access and utilize the requested service, to facilitate denying the communication device access to the service. In response to the not-validated information, the application component can deny the communication device access to the service and can prevent the communication device from accessing the service.

Referring again to reference numeral 910, if, at 910, it is determined that the token is validated, at 916, subscriber-related information associated with the communication device can be analyzed. In response to validating the token and associated communication device, and based at least in part on the device identifier information, the authentication server can retrieve subscriber-related information associated with the communication device and/or associated user from the subscriber database stored in the data store. The authentication server can analyze the subscriber-related information to facilitate determining a subscriber status of the subscriber (e.g., the communication device and/or the user), a service plan the subscriber has with regard to the service, and/or other relevant information to facilitate determining whether the communication device is authorized to access and utilize the service, and, if so, to what extent is the communication device authorized to access and utilize the service, in accordance with the service plan.

At 918, a determination can be made regarding whether the communication device is authorized to access the service based at least in part on the results of analyzing the subscriber-related information. Based at least in part on the results of analyzing the subscriber-related information, including the subscriber status and service plan, if any, associated with the communication device, the authentication server can determine whether the communication device and/or associated user are authorized to access and utilize the service.

In response to determining that the communication device is not authorized to access the service, the method 900 can proceed to reference numeral 914, wherein not-validated information can be communicated to the application component to facilitate denying the communication device access to the service. If the authentication server determines that the communication device and/or user are not authorized to access the service, the authentication server can communicate the not-validated information to the application component to facilitate denying the communication device access to the service. For example, if, based at least in part on the results of analyzing the subscriber-related information, the authentication server determines that the subscriber status associated with the communication device indicates that the subscription to the service is currently terminated or suspended, or determines that no subscription for the service ever existed with respect to the communication device and/or user, the authentication server can determine that the communication device and/or user are not authorized to access the service. Based on such not-authorized determination, the authentication server can generate the not-validated information, which can be or can comprise not-authorized information, and can communicate the not-validated information to the application component. In response to the not-validated information, the application component can deny the communication device access to the service and can prevent the communication device from accessing the service.

Referring again to reference numeral 918, if, at 918, it is determined that the communication device is authorized to access the service, at 920, a permitted portion of the subscriber-related information that is permitted to be provided to the application component can be determined based at least in part on the results of analyzing the subscriber-related information and a defined trust level associated with the application component. In response to determining that the communication device and/or user are authorized to access the service, the authentication server can determine a permitted portion of the subscriber-related information that is permitted to be provided to the application component based at least in part on the results of analyzing the subscriber-related information and the defined trust level associated with the application component. For instance, the authentication server can determine that, for the communication device and/or user, the subscriber status with regard to the service is active and/or the requested service is permitted by the service plan associated with the communication device and/or user. With the communication device and/or user being determined to be authorized, the authentication server can determine what items of subscriber-related information of the subscriber the application component is permitted to access or have, based at least in part on the defined trust level associated with the application component.

At 922, validation-related information, comprising the permitted portion of the subscriber-related information, can be communicated to the application component to facilitate allowing the communication device to access and utilize the service via the application component. The authorization component can communicate the validation-related information, comprising the permitted portion of the subscriber-related information, to the application component to facilitate allowing the communication device and/or associated user to access and utilize the service via the application component. In some embodiments, the authorization component can encrypt the validation-related information and communicate the validation-related information via an encrypted communication channel to the application component.

Figure 10:
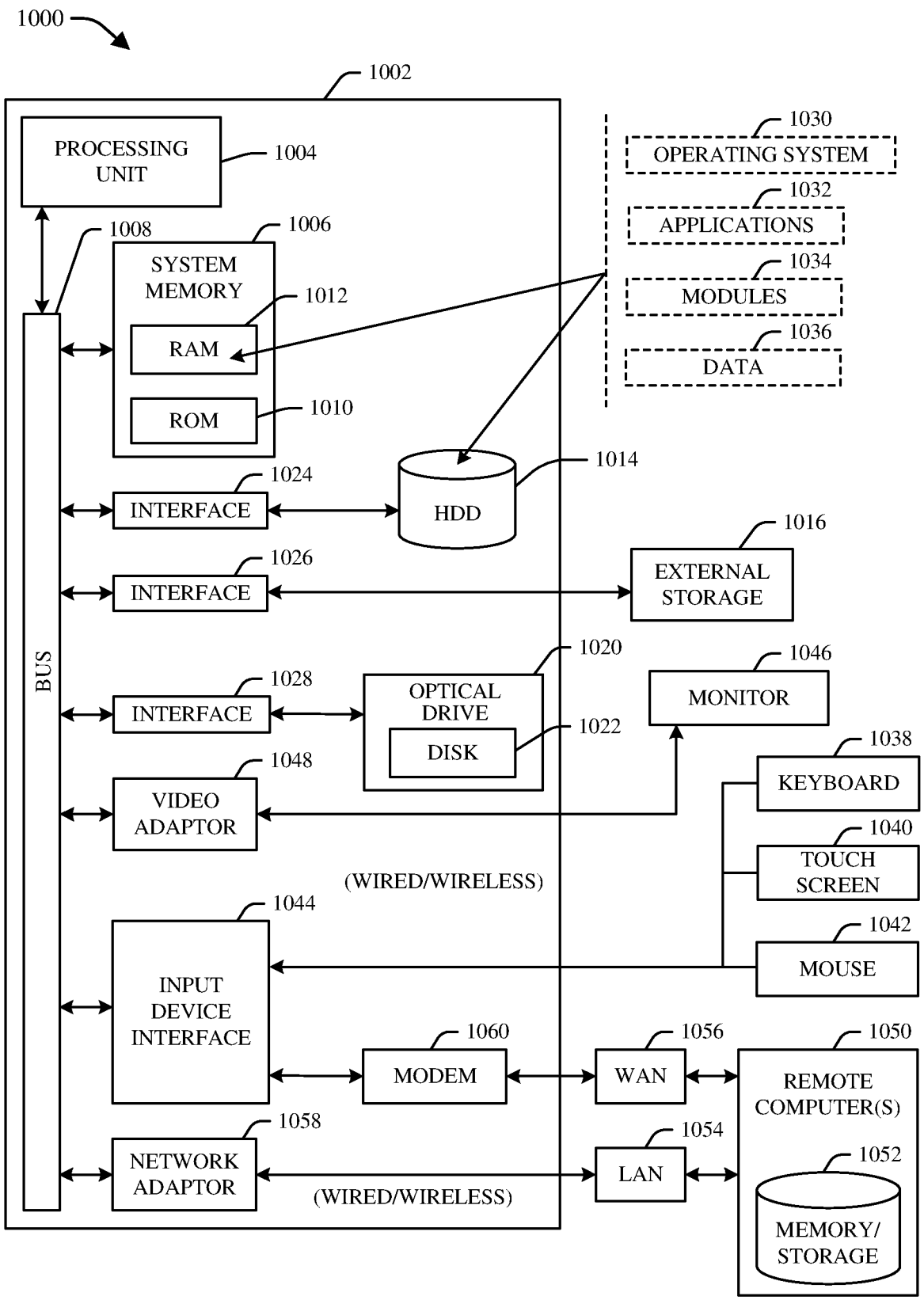
FIG. 10 is a schematic block diagram illustrating a suitable computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH™ interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, communication network, base station, application component, authorization component, service, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
in connection with a service request to utilize a service communicated by a device to an application server, and, in response to an authentication request received from the device, communicating, by an authorization server comprising a processor, an encrypted authentication token to the device, wherein the encrypted authentication token comprises encrypted device identifier information that facilitates identifying the device;
receiving, by the authorization server, a token validation request, comprising the encrypted authentication token, from the application server, wherein the application server received the encrypted authentication token from the device, wherein the authorization server is part of a first communication network, and wherein the application server is part of a second communication network and is external to the first communication network; and
determining, by the authorization server, whether the device is validated based on analyzing the encrypted authentication token and a private decryption key, wherein the authorization server generated the encrypted authentication token and communicated the encrypted authentication token to the device prior to the device having sent the encrypted authentication token to the application server, and wherein the authorization server does not share the private decryption key with the application server.

2. The method of claim 1, further comprising:
in response to determining that the device is validated, determining, by the authorization server, a subscriber status associated with the device, based on analyzing subscriber status information stored in a data store, to determine whether the device is eligible to utilize the service; and
in response to determining that the device is validated and eligible to utilize the service, communicating, by the authorization server, validation-related information to the application server, wherein the validation-related information indicates that the device is validated and is eligible to utilize the service.

3. The method of claim 2, wherein the first communication network is a mobility core network, wherein the second communication network is a service provider network, wherein the authorization server is part of the mobility core network and the service provider network, and wherein the method further comprises:
determining, by the authorization server, whether to communicate, to the application server, items of subscriber-related information associated with the device based on a defined trust level associated with the application server, wherein the communicating the validation-related information comprises: based on the defined trust level, communicating, by the authorization server, the validation-related information, comprising some of the items of the subscriber-related information associated with the device, to the application server.

4. The method of claim 1, wherein an initialization vector associated with the encrypted authentication token is not shared with the application server, and wherein the determining whether the device is validated comprises determining, by the authorization server, whether the device is validated based on the analyzing of the encrypted authentication token, the private decryption key, and the initialization vector.

5. The method of claim 1, wherein the private decryption key is not shared with the application server even though the application server has been determined to satisfy a defined trust level criterion.

6. The method of claim 1, further comprising:
in response to determining that the device is not validated based on the analyzing of the encrypted authentication token and the private decryption key, communicating, by the authorization server, not-validated information to the application server, wherein the not-validated information indicates that the device is not validated and is not eligible to utilize the service requested by the device.

7. The method of claim 6, wherein the device is prevented from connecting to and utilizing the service based on the not-validated information.

8. The method of claim 6, wherein the encrypted authentication token is a stolen encrypted authentication token or a falsified encrypted authentication token that is determined to be invalid.

9. The method of claim 1, further comprising:
encrypting, by the authorization server, information, comprising device identifier information that identifies the device, based on an encryption key and an initialization vector, to generate the encrypted authentication token comprising the encrypted device identifier information associated with the device, wherein the device identifier information comprises an international mobile subscriber identity, a mobile station international subscriber directory number, a media access control address, an Internet protocol address, a transaction identifier, or a device serial number associated with the device.

10. The method of claim 9, further comprising:
in response to receiving the encrypted authentication token from the application server, decrypting, by the authorization server, the encrypted authentication token, comprising the encrypted device identifier information, based on the private decryption key and the initialization vector, to generate the information, comprising the device identifier information,
wherein the determining whether the device is validated comprises determining whether the device is validated based on the information, comprising the device identifier information that identifies the device.

11. A system, comprising:
a processor; and
a memory that stores executable instructions that, when executed by the processor, facilitate performance of operations, comprising:
in response to an authentication request received from a device, transmitting, by an authorization server of the system, an encrypted token to the device, wherein the authentication request is received in connection with a service request to utilize a service transmitted by the device to a configuration server, and wherein the encrypted token comprises encrypted device identifier data that facilitates identification of the device;
receiving, by the authorization server, the encrypted token from the configuration server, wherein the configuration server received the encrypted token from the device, wherein the authorization server is part of a first network, and wherein the configuration server is part of a second network and is external to the first network; and
determining, by the authorization server, whether the device is authenticated based on the encrypted token and a private decryption key, wherein the authorization server generated the encrypted token and transmitted the encrypted token to the device prior to the device having transmitted the encrypted token to the configuration server, and wherein the authorization server does not share the private decryption key with the configuration server.

12. The system of claim 11, wherein the operations further comprise:
in response to determining that the device is authenticated, determining, by the authorization server, a subscriber status associated with the device, based on analyzing subscriber status data stored in a data store, to determine whether the device is permitted to utilize the service; and
one of:
in response to determining that the device is authenticated and permitted to utilize the service, transmitting, by the authorization server, verification-related data to the configuration server, wherein the verification-related data indicates that the device is authenticated and is permitted to utilize the service, or
in response to determining that the device is authenticated, and in response to determining that the device is not permitted to utilize the service, transmitting, by the authorization server, not-authorized data to the configuration server, wherein the not-authorized data indicates that the device is not permitted to utilize the service.

13. The system of claim 12, wherein the operations further comprise:
in response to determining that the device is authenticated and permitted to utilize the service, determining whether to transmit, to the configuration server, a group of items of subscriber-related data associated with the device based on a defined trust level associated with the configuration server, wherein the group of items of subscriber-related data comprises a first item of subscriber-related data and a second item of subscriber-related data; and
based on the defined trust level, determining that the configuration server is permitted to have the first item of subscriber-related data and is not permitted to have the second item of subscriber-related data, wherein the transmitting the verification-related data comprises: transmitting, to the configuration server, the verification-related data, comprising the first item of subscriber-related data associated with the device, wherein the second item of subscriber-related data is not transmitted to the configuration server.

14. The system of claim 11, wherein an initialization vector associated with the encrypted token is not shared with the configuration server, and wherein the determining whether the device is authenticated comprises determining, by the authorization server, whether the device is authenticated based on analyzing the encrypted token, the private decryption key, and the initialization vector.

15. The system of claim 11, wherein the authorization server secures the private decryption key from access by the configuration server, even though the configuration server is determined to satisfy a defined trust level criterion, and wherein the authorization server is an open identification connect server.

16. The system of claim 11, wherein the operations further comprise:
in response to determining that the device is not authenticated based on the encrypted token and the private decryption key, transmitting, by the authorization server, not-authenticated data to the configuration server, wherein the not-authenticated data indicates that the device is not authenticated and is not permitted to utilize the service requested by the device, and wherein the device is prevented from connecting to and utilizing the service based on the not-authenticated data.

17. The system of claim 11, wherein the operations further comprise:
encrypting, by the authorization server, data, comprising device identifier data that identifies the device, based on an encryption key and an initialization vector, to generate the encrypted token comprising the encrypted device identifier data associated with the device, wherein the device identifier data comprises an international mobile subscriber identity, a mobile station international subscriber directory number, a media access control address, an Internet protocol address, a transaction identifier, or a device serial number associated with the device.

18. The system of claim 17, wherein the operations further comprise:
in response to receiving the encrypted token from the configuration server, decrypting, by the authorization server, the encrypted token, comprising the encrypted device identifier data, based on the private decryption key and the initialization vector, to generate the data, comprising the device identifier data,
wherein the determining whether the device is authenticated comprises determining whether the device is authenticated based on the data, comprising the device identifier data that identifies the device.

19. A non-transitory machine-readable medium, comprising executable instructions that, when executed by a processor of authorization server equipment, facilitate performance of operations, comprising:
in response to an authentication request received from a user equipment, communicating an encrypted authentication token to the user equipment, wherein the authentication request is received in connection with a service request to access a service that is communicated by the user equipment to configuration server equipment, and wherein the encrypted authentication token comprises encrypted user equipment identifier information that facilitates identifying the user equipment;
receiving the encrypted authentication token from the configuration server equipment, wherein the configuration server equipment receives the encrypted authentication token from the user equipment, wherein the authorization server equipment is within a first communication network, and wherein the application server equipment is within a second communication network and is external to and not part of the first communication network; and
determining whether the user equipment is verified based on the encrypted authentication token and a private decryption key, wherein the authorization server equipment generated the encrypted authentication token and communicated the encrypted authentication token to the user equipment prior to the user equipment having communicated the encrypted authentication token to the configuration server equipment, and wherein the authorization server equipment secures the private decryption key from being accessed by the configuration server equipment.

20. The non-transitory machine-readable medium of claim 19, wherein the operations further comprise:
one of:
in response to determining that the user equipment is not verified based on the encrypted authentication token and the private decryption key, communicating not-verified information to the configuration server equipment, wherein the not-verified information indicates that the user equipment is not verified and is not authorized to utilize the service requested by the user equipment; or
in response to determining that the user equipment is verified based on the encrypted authentication token and the private decryption key, determining a subscriber status associated with the user equipment, based on analyzing subscriber status information, to determine whether the user equipment is authorized to utilize a service, and
in response to determining that the user equipment is verified and authorized to utilize the service, communicating verification-related information to the configuration server equipment, wherein the verification-related information indicates that the user equipment is verified and is authorized to utilize the service.

* * * * *